(12) United States Patent
Urasawa

(10) Patent No.: US 9,344,592 B2
(45) Date of Patent: May 17, 2016

(54) INFORMATION PROCESSING DEVICE AND INFORMATION PROCESSING METHOD

(71) Applicant: Oki Data Corporation, Tokyo (JP)

(72) Inventor: Koji Urasawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/587,715

(22) Filed: Dec. 31, 2014

(65) Prior Publication Data

US 2015/0201093 A1 Jul. 16, 2015

(30) Foreign Application Priority Data

Jan. 16, 2014 (JP) .................................. 2014-005811

(51) Int. Cl.
*G06F 3/12* (2006.01)
*H04N 1/00* (2006.01)

(52) U.S. Cl.
CPC ....... *H04N 1/00411* (2013.01); *H04N 1/00413* (2013.01); *H04N 1/00482* (2013.01); *H04N 1/00946* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 7,084,916 B2 * | 8/2006 | Morimoto et al. | 348/333.01 |
| 7,406,664 B1 * | 7/2008 | Morton et al. | 715/809 |
| 8,307,409 B2 * | 11/2012 | Takahashi | 726/4 |
| 8,335,011 B2 * | 12/2012 | Toda | 358/1.9 |
| 8,488,178 B2 * | 7/2013 | Fukata | G06F 3/048 348/333.05 |
| 8,553,270 B2 * | 10/2013 | Miyake | G03G 15/5016 358/1.16 |
| 2005/0149571 A1 * | 7/2005 | Jeon et al. | 707/104.1 |
| 2005/0198072 A1 * | 9/2005 | Iinuma et al. | 707/104.1 |
| 2006/0044587 A1 * | 3/2006 | Yoshida | H04N 1/00 358/1.13 |
| 2006/0132833 A1 * | 6/2006 | Terabe | H04N 1/00411 358/1.15 |
| 2008/0177775 A1 * | 7/2008 | Kawate et al. | 707/102 |
| 2011/0026075 A1 * | 2/2011 | Maruyama et al. | 358/1.15 |
| 2013/0132447 A1 * | 5/2013 | Maeda | 707/821 |
| 2014/0198344 A1 * | 7/2014 | Hirata | 358/1.15 |
| 2015/0092213 A1 * | 4/2015 | Tohne | 358/1.13 |

FOREIGN PATENT DOCUMENTS

| | | | |
|---|---|---|---|
| EP | 2320320 A1 | 5/2011 | |
| JP | 2008-071293 A | 3/2008 | |

* cited by examiner

*Primary Examiner* — Dung Tran
(74) *Attorney, Agent, or Firm* — Rabin & Berdo, P.C.

(57) ABSTRACT

In order to prevent processing from being performed on a file included in a folder on which the processing should not be performed when the processing is performed on the folder, an image processing device (100) includes an input unit (142) which receives designation of a folder and an execution instruction of first processing to be performed on the designated folder, based on user's operation, a display unit (141) which displays a list of files stored in the designated folder when the input unit (142) receives the designation of the folder and the execution instruction, and an execution unit (121) which executes the first processing on the folder when the input unit (142) receives the confirmation input of execution of the first processing on the designated folder, based on user's operation, after the display unit (141) displays the list of files.

9 Claims, 24 Drawing Sheets

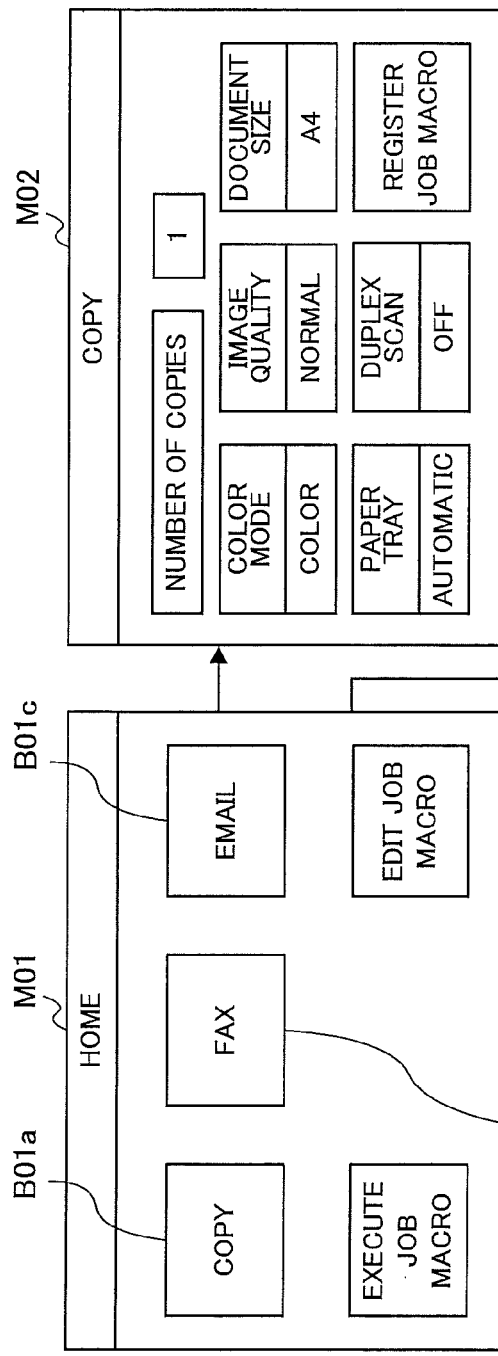
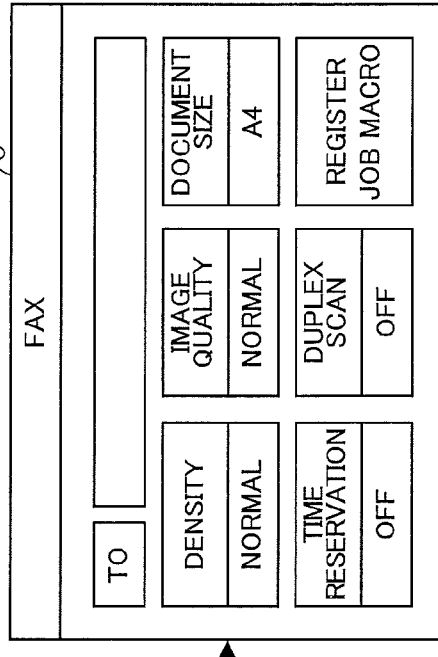
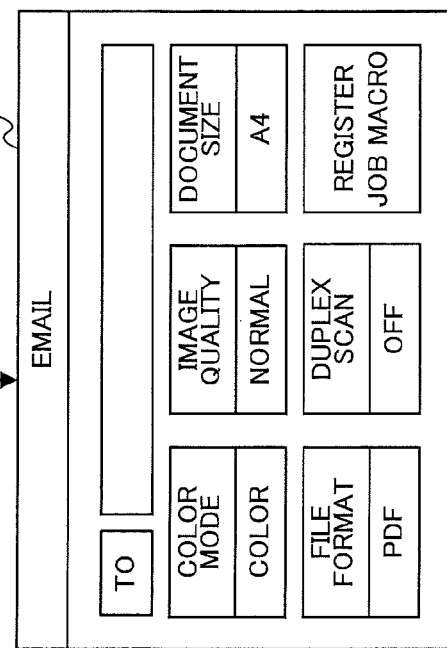
FIG. 5A
FIG. 5B
FIG. 5C
FIG. 5D

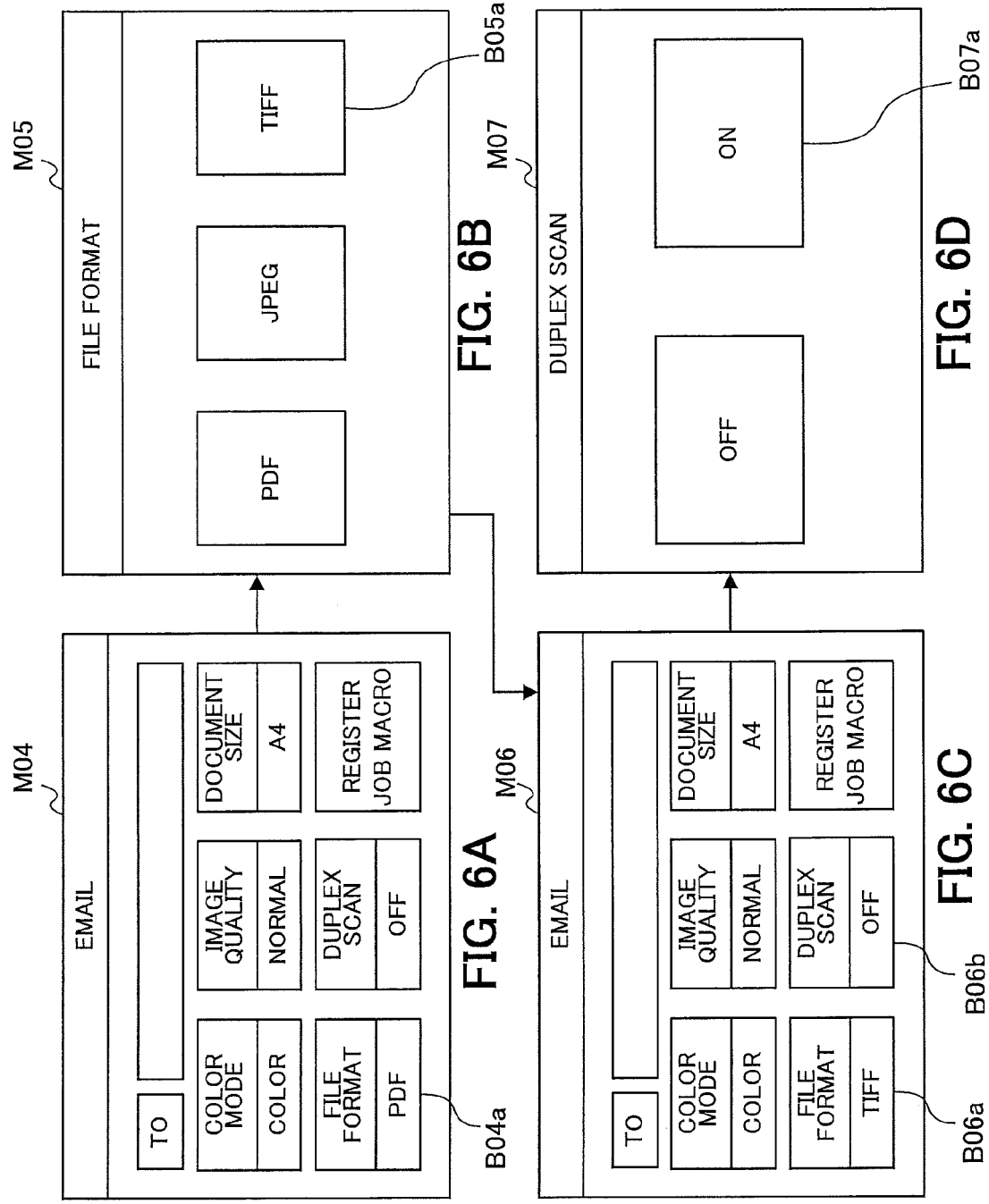

FIG. 8

| | | 116 |
|---|---|---|
| 116a | operation | ScanToEmail |
| 116b | destination | N/A |
| 116c | color mode | color |
| 116d | image quality | normal |
| 116e | document size | A4 |
| 116f | file format | TIFF |
| 116g | duplex scan | ON |

111a ⟶ name　　　　　　, ScanToEmail-TIFF-Duplex
111b ⟶ operation　　　　, ScanToEmail
111c ⟶ destination　　　, N/A
111d ⟶ color mode　　　 , color
111e ⟶ image quality　　, normal
111f ⟶ document size　　, A4
111g ⟶ file format　　　, TIFF
111h ⟶ duplex scan　　　, ON

INFORMATION PROCESSING DEVICE AND INFORMATION PROCESSING METHOD

BACKGROUND OF THE INVENTION

1. Field of the Invention

The present invention relates to an information processing device and an information processing method.

2. Description of the Related Art

In conventional technology, when a folder is processed, all files stored in the folder are also processed together.

In a file management system disclosed in Japanese Unexamined Patent Application Publication No. 2008-71293, for example, all files in a folder are moved to another folder or deleted together.

SUMMARY OF THE INVENTION

With the conventional technology, when a folder is processed, a file in the folder may be also processed, even if the file should not be processed.

It is an object of the present invention to prevent the file which should not be processed in the folder from being processed when the folder is processed.

An information processing device according to an embodiment of the invention includes: an instruction unit which receives designation of a folder and an execution instruction of first processing to be performed on the designated folder, based on user's operation; a display unit which displays a list of files stored in the designated folder when the instruction unit receives the designation of the folder and the execution instruction; a receiving unit which receives confirmation input of execution of the first processing on the designated folder, based on user's operation, after the list of files is displayed on the display unit; and an execution unit which executes the first processing on the designated folder when the receiving unit receives the confirmation input.

An information processing method according to an embodiment of the invention includes: receiving designation of a folder and an execution instruction of first processing to be performed on the designated folder, based on user's operation; displaying a list of files stored in the designated folder when the designation of the folder and the execution instruction are received; receiving confirmation input of execution of the first processing on the designated folder, based on user's operation, after the list of files is displayed; and executing the first processing on the designated folder when the confirmation input is received.

According to one aspect of the invention, it is possible to prevent a file which should not be processed in a folder from being processed when the folder is processed.

BRIEF DESCRIPTION OF THE DRAWINGS

FIGS. 5A to 5D are schematic diagrams showing an example of pictures displayed when a function is selected in the image processing device in the first embodiment.

FIGS. 6A to 6D are schematic diagrams showing an example of first pictures displayed when a setting value is changed in the image processing device in the first embodiment.

FIG. 8 is a schematic diagram showing contents of mail transmission parameters in the first embodiment.

FIG. 11 is a schematic diagram showing contents of the job macro setting file in the first embodiment.

DETAILED DESCRIPTION OF THE INVENTION

First Embodiment

Figure 1:
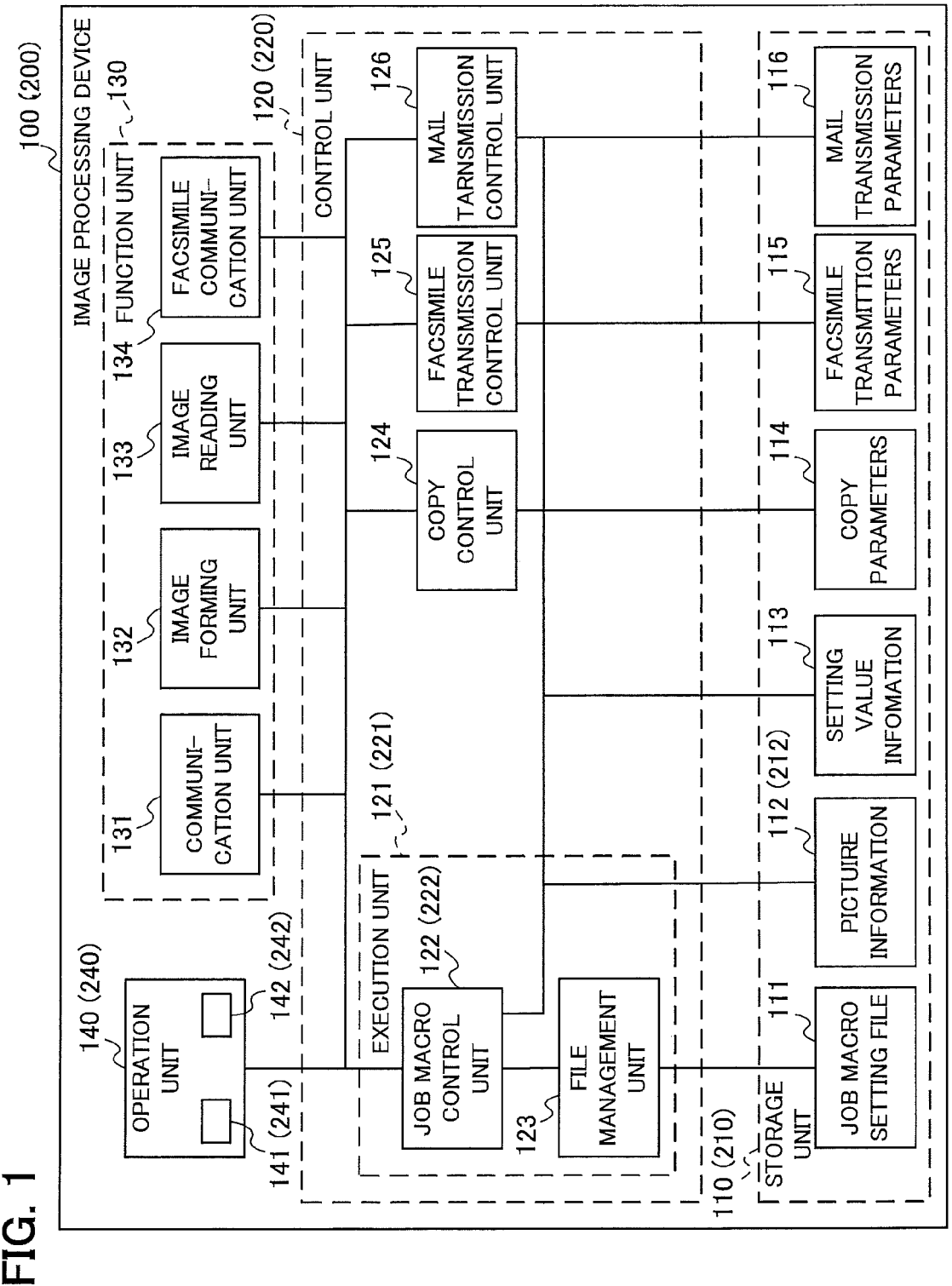
FIG. 1 is a block diagram schematically showing a configuration of an image processing device according to a first embodiment and a second embodiment.

FIG. 1 is a block diagram schematically showing a configuration of an image processing device 100, which is an example of an information processing device according to a first embodiment.

The image processing device 100 includes a storage unit 110, a control unit 120, a function unit 130, and an operation unit 140. Reference numerals in parentheses in FIG. 1 indicate components in a second embodiment.

The storage unit 110 stores information required for processing in the image processing device 100. The storage unit 110 stores a job macro setting file 111, picture information 112, setting value information 113, copy parameters 114, facsimile transmission parameters 115, and mail transmission parameters 116, for example.

The job macro setting file 111 is a file saving job macro setting values. The job macro setting values are selected in advance for a predetermined function. By using the job macro setting file 111, a user can cause the function unit 130 to perform predetermined processing in accordance with the pre-selected Setting values without carrying out a series of operations to select the setting values. The job macro setting file 111 can be considered as a file indicating execution contents of processing (second processing).

Figure 2:
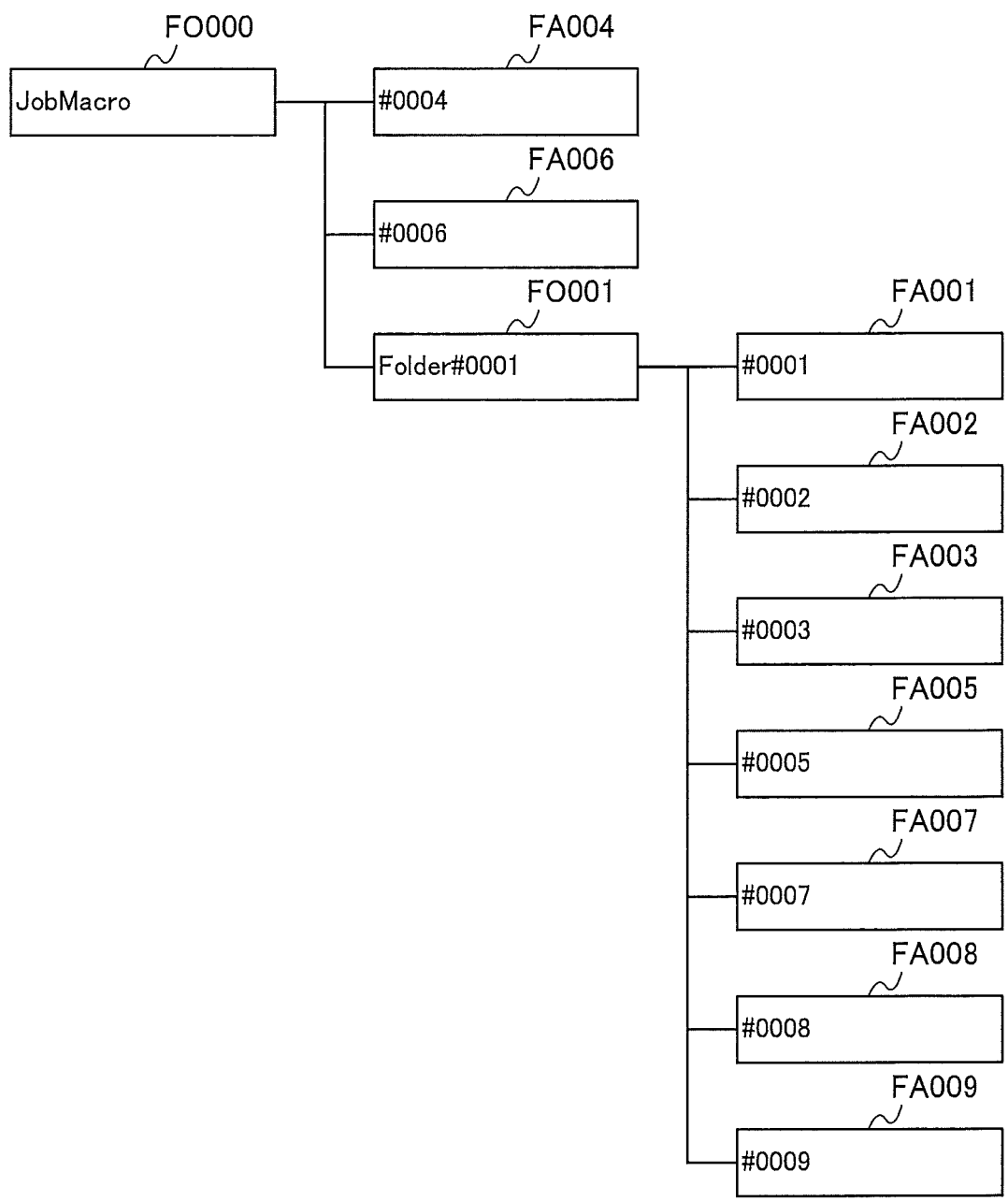
FIG. 2 is a schematic diagram showing a first example of a storage state of job macro setting files in the first embodiment.

FIG. 2 is a schematic diagram showing a storage state of the job macro setting files 111.

The job macro setting files 111 are stored under a folder FO000 (root folder) named JobMacro. In FIG. 2, a file FA004 named #0004, a file FA006 named #0006, and a folder FO001 named Folder#0001 are stored immediately under the folder FO000 named JobMacro. A single file corresponds to a single job macro and saves setting values of the single job macro. Under the folder FO001 named Folder#0001, seven files FA001, FA002, FA003, FA005, FA007, FA008, and FA009 are stored.

As shown in FIG. 2, the job macro setting files 111 are managed in a hierarchical structure (tree structure) by using folders. A file saving location (hierarchical level) is called a folder here but may be called a directory.

Referring back to FIG. 1, the picture information 112 is information required to generate picture data for a picture to be displayed on the operation unit 140. The picture information 112 includes a command and partial image data to generate the picture data for the picture to be displayed on the operation unit 140, for example.

The setting value information 113 indicates setting values that can be selected when the function unit 130 preforms processing corresponding to each function and initial values in the setting values.

The copy parameters 114 indicate setting values selected when the function unit 130 performs copying.

The facsimile transmission parameters 115 indicate setting values selected when the function unit 130 performs facsimile transmission.

The mail transmission parameters 116 indicate setting values selected when the function unit 130 performs mail transmission.

In an initial state, the initial values indicated by the setting value information 113 are selected for the copy parameters 114, facsimile transmission parameters 115, and mail transmission parameters 116.

The control unit 120 controls processing performed in the image processing device 100.

The control unit 120 includes an execution unit 121, a copy control unit 124, a facsimile transmission control unit 125, and a mail transmission control unit 126.

The execution unit 121 selects setting values when the function unit 130 performs processing. For example, the execution unit 121 performs management (such as generation, correction, deletion and the like) of the job macro setting file 111 and selects setting values for the processing to be performed by the function unit 130 in accordance with the job macro setting file 111. The execution unit 121 also executes processing (first processing) on the folder storing the job macro setting file 111.

The execution unit 121 includes a job macro control unit 122 and a file management unit 123.

The job macro control unit 122 receives from the user a selection of a setting value for the processing to be performed by the function unit 130 through the operation unit 140 and reflects the selected setting value to the copy parameters 114, facsimile transmission parameters 115, or mail transmission parameters 116. Especially, when receiving an instruction to execute the job macro setting file 111 from the user through the operation unit 140, the job macro control unit 122 reflects the setting values indicated by the job macro setting file 111 to the copy parameters 114, the facsimile transmission parameters 115, or the mail transmission parameters 116. The job macro control unit 122 further receives input of an instruction on the job macro setting file 111 from the user through the operation unit 140 and directs the file management unit 123 to perform the processing corresponding to the received instruction.

The file management unit 123 manages the job macro setting file 111 in accordance with the direction from the job macro control unit 122.

The copy control unit 124 controls processing related to copy function.

The facsimile transmission control unit 125 controls processing related to facsimile transmission function.

The mail transmission control unit 126 controls. processing related to mail transmission function.

The function unit 130 executes processing related to a function implemented by the image processing device 100.

The function unit 130 includes a communication unit 131, an image forming unit 132, an image reading unit 133, and a facsimile communication unit 134.

The communication unit 131 executes communication processing.

The image forming unit 132 executes image forming processing.

The image reading unit 133 executes image reading processing.

The facsimile communication unit 134 executes facsimile communication processing.

The operation unit 140 receives input of an operation from the user. For example, the operation unit 140 functions as an instruction unit which receives designation of a folder and an execution instruction for processing of the designated folder in accordance with the operation from the user. The operation unit 140 also functions as a receiving unit which receives confirmation input to confirm the execution of the processing of the designated folder or rejection input to reject the execution of the processing of the designated folder, in accordance with the operation from the user. The operation unit 140 further functions as a file designation unit which receives designation of a file stored in the folder. The operation unit 140 also functions as an information receiving unit which receives information input by the user for each file.

Specifically, the operation unit 140 includes a display unit 141 which shows a picture to the user and an input unit 142 which receives input of an operation from the user.

Figure 3:
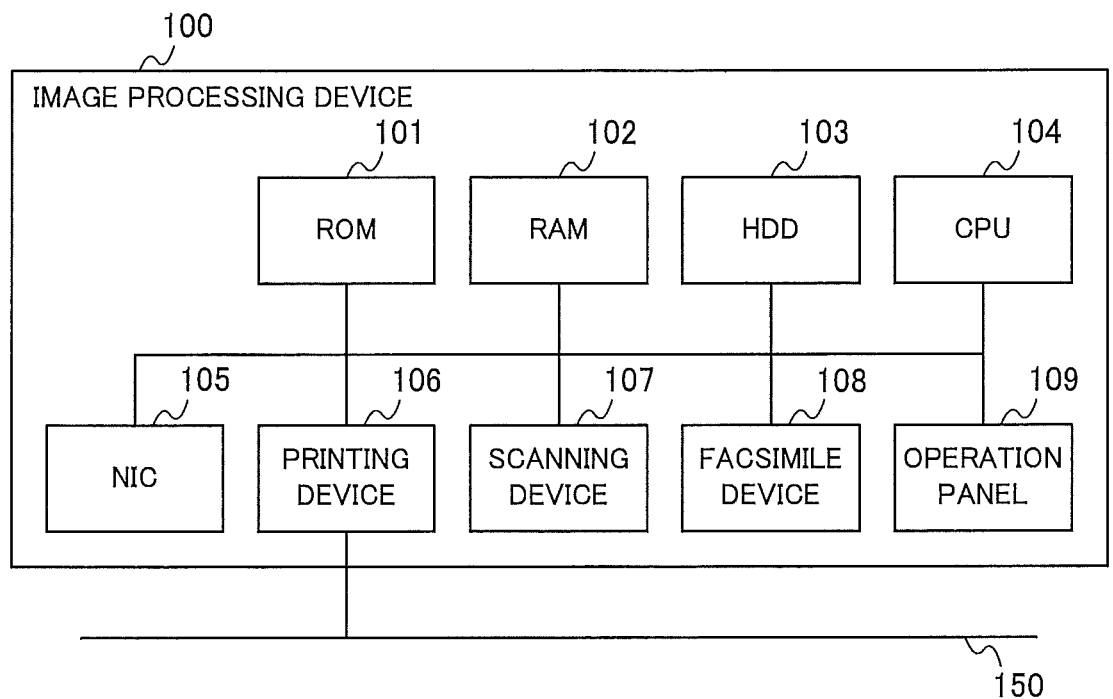
FIG. 3 is a block diagram showing a hardware configuration of the image processing device in the first embodiment.

FIG. 3 is a block diagram showing a hardware configuration of the image processing device 100.

The image processing device 100 includes a ROM (read only memory) 101, a RAM (random access memory) 102, an HDD (hard disk drive) 103, a CPU (central processing unit) 104, an NIC (network interface card) 105, a printing device 106, a scanning device 107, a facsimile device 108, and an operation panel 109.

The NIC 105 sends and receives data through a network 150 by using known communication technologies.

The printing device 106 prints (forms) an image on paper medium by using known printing technologies (image forming technologies).

The scanning device 107 reads image data from a original document by using known optical reading technologies.

The facsimile device 108 sends and receives image data through a telephone line by using known communication technologies.

The storage unit 110 shown in FIG. 1 can be implemented by the ROM 101, the RAM 102, and the HDD 103 controlled by the CPU 104. For example, it is preferred to store the job macro setting file 111 in the HDD 103, to store the picture information 112 and the setting value information 113 in the ROM 101, and to store the copy parameters 114, the facsimile transmission parameters 115, and the mail transmission parameters 116 in the RAM 102.

The control unit 120 can be implemented by loading a program stored in the ROM 101 into the RAM 102 and executing the program by the CPU 104.

The communication unit 131 can be implemented by the NIC 105 connected to the network 150 and controlled by the CPU 104.

The image forming unit 132 can be implemented by the printing device 106 controlled by the CPU 104.

The image reading unit 133 can be implemented by the scanning device 107 controlled by the CPU 104.

The facsimile communication unit 134 can be implemented by the facsimile device 108 controlled by the CPU 104.

The operation unit 140 can be implemented by the operation panel 109 controlled by the CPU 104.

Figure 4:
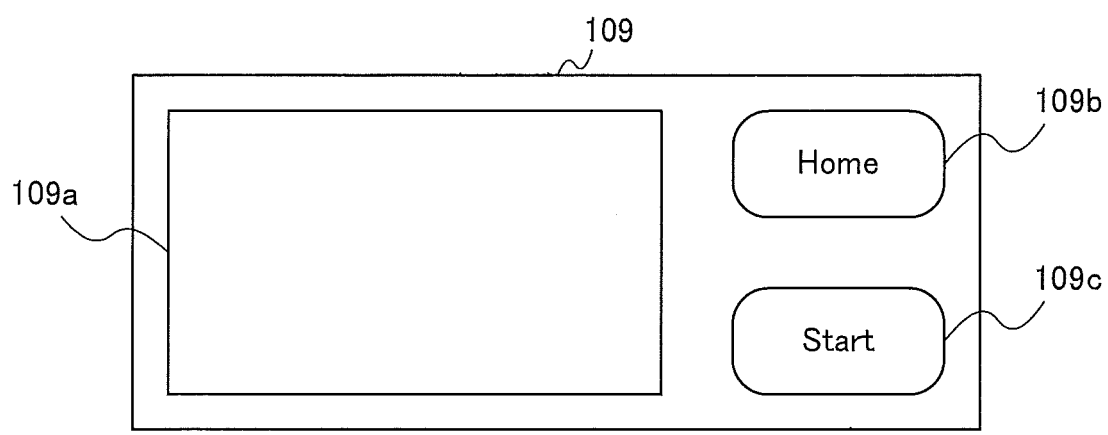
FIG. 4 is a schematic diagram showing an example of external appearance of an operation panel in the first embodiment.

FIG. 4 is a schematic diagram showing an example of external appearance of the operation panel 109.

The operation panel 109 includes a touch panel 109a which functions as the display unit 141 and the input unit 142, and a Home key 109b and a Start key 109c which function as the input unit 142.

FIGS. 5A to 5D are schematic diagrams showing an example of pictures displayed on the operation unit 140 when a function is selected in the image processing device 100.

In an initial state, the job macro control unit 122 causes the touch panel 109a of the operation panel 109 as shown in FIG. 4 to display a home picture M01 as shown in FIG. 5A in accordance with the picture information 112 stored in the storage unit 110. When a Copy button B01a is pressed on the home picture M01, the job macro control unit 122 causes the touch panel 109a to display a copy picture M02 as shown in FIG. 5B in accordance with the picture information 112 and setting value information 113 stored in the storage unit 110. When a Fax button B01b is pressed on the home picture M01, the job macro control unit 122 causes the touch panel 109a to display a fax picture M03 as shown in FIG. 5C in accordance with the picture information 112 and setting value information 113 stored in the storage unit 110. When a email button B01c is pressed on the home picture M01, the job macro control unit 122 causes the touch panel 109a to display a email picture M04 as shown in FIG. 5D in accordance with the picture information 112 and setting value information 113 stored in the storage unit 110.

When the Home key 109b is pressed on the operation panel 109 as shown in FIG. 4, the job macro control unit 122 causes the touch panel 109a to display the home picture M01 as shown in FIG. 5A instead of any picture currently displayed on the touch panel 109a in accordance with the picture information 112 stored in the storage unit 110. When the user selects necessary setting values on the function picture M02, M03, or M04 and presses the Start key 109c, the function unit 130 executes the corresponding function with the selected setting values. The initial values included in the setting value information 113 are displayed on the function pictures M02, M03, and M04.

FIGS. 6A to 6D and FIG. 7 are schematic diagrams showing an example of pictures displayed on the operation unit 140 when a setting value is changed in the image processing device 100. FIGS. 6A to 6D and 7 show an example of pictures displayed when a setting value of the mail transmission function is changed.

Figure 7:
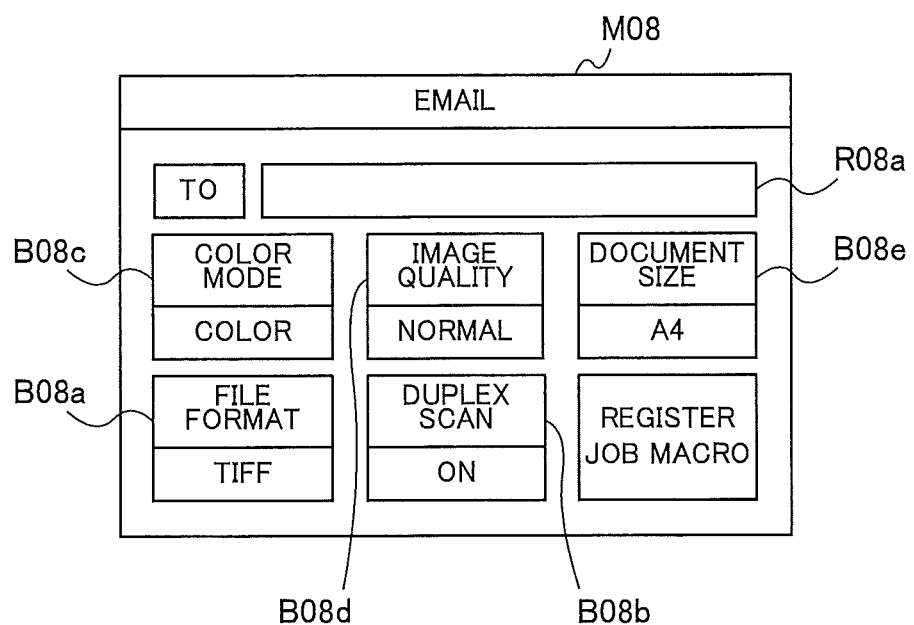
FIG. 7 is a schematic diagram showing an example of a second picture displayed when a setting value is changed in the image processing device in the first embodiment.

When a File Format button B04a is pressed on the email picture M04 as shown in FIG. 6A, the job macro control unit 122 causes the touch panel 109a to display a file format setting picture M05 as shown in FIG. 6B in accordance with the picture information 112 and setting value information 113 stored in the storage unit 110. When a TIFF button B05a is pressed on the file format setting picture M05, since it means that TIFF (tagged image file format) is selected as a file format, the job macro control unit 122 causes the touch panel 109a to display a email picture M06 as shown in FIG. 6C, in accordance with the picture information 112 and setting value information 113 stored in the storage unit 110. The selected TIFF is displayed in a File Format button B06a on the email picture M06. When a Duplex Scan button B06b is pressed on the email picture M06, the job macro control unit 122 causes the touch panel 109a to displays a duplex scan setting picture M07 as shown in FIG. 6D, in accordance with the picture information 112 and setting value information 113 stored in the storage unit 110. When an ON button B07a is pressed on the duplex scan setting picture M07, since it means that ON is selected for the duplex scan function, in other words that duplex scanning is selected, the job macro control unit 122 accordingly causes the touch panel 109a to display the email picture M08 as shown in FIG. 7, in accordance with the picture information 112 and setting value information 113 stored in the storage unit 110. The selected ON is displayed in a Duplex Scan button B08b on the email picture M08. The job macro control unit 122 stores the setting values selected on the email pictures M04, M06, and M08 as the mail transmission parameters 116 in the storage unit 110.

FIG. 8 is a schematic diagram showing the contents of the mail transmission parameters 116 including the setting values selected in the email picture M08 as shown in FIG. 7.

The mail transmission parameters 116 include an operation field 116a, a destination field 116b, a color mode field 116c, an image quality field 116d, a document size field 116e, a file format field 116f, and a duplex scan field 116g.

The operation field 116a stores a function name, which is function identification information for identifying the function to be executed in accordance with the setting value. ScanToEmail, which means email transmission, is stored in the shown example.

The destination field 116b stores an email address, which is a communication address to which an email is sent. In FIG. 7, since no email address has been input in a destination input field R08a, N/A, which indicates that no email address has been input, is stored in the field 116b.

The color mode field 116c stores a color setting value, which indicates whether or not the document is read in color. Since color is selected in a Color Mode button B08c in FIG. 7, color is stored in this filed 116c, as a setting value indicating that the document is read in color.

The image quality field 116d stores a resolution setting value, which indicates a document reading quality, or resolution here. Since Normal is selected in the Image Quality button B08b in FIG. 7, normal is stored in this field 116d, as a setting value for reading the document at a normal resolution such as 400 dpi.

The document size field 116e stores a document size setting value, which indicates a size of a document to be read. Since A4 is selected in a Document Size button B08e in FIG. 7, A4 is stored in the field 116e, as a setting value for reading the document in A4 size.

The file format field 116f stores a file format setting value, which indicates a file format of the image data read from the document. Since TIFF is selected in a File Format button B08a in FIG. 7, TIFF is stored in the field 116f, as a setting value for generating a TIFF image from the document.

The duplex scan field 116g stores a duplex scan setting value, which indicates whether or not image data are read from both sides of the document. Since ON is selected in the Duplex Scan button B08b in FIG. 7, ON is stored in the field 116g, as a setting value for reading image data from both sides of the document.

In the copy picture M02 shown in FIG. 5B and the fax picture M03 shown in FIG. 5C, the setting value can be changed by operations similar to those illustrated in FIGS. 6A to 6D and FIG. 7. The setting values selected through those pictures are respectively reflected to the copy parameters. 114 and facsimile transmission parameters 115.

FIGS. 9A to 9D are schematic diagrams showing an example of pictures displayed when a group of setting values is stored as the job macro setting file 111 in the image processing device 100. FIGS. 9A to 9D show an example of pictures that are displayed when setting values of the email transmission function are stored as the job macro setting file 111.

When a Register Job Macro button B08f is pressed on an email picture M08 as shown in FIG. 9A, the job macro control unit 122 causes the touch panel 109a to display a job macro registration confirmation picture M09 as shown in FIG. 9B, in accordance with the picture information 112 and mail transmission parameters 116 stored in the storage unit 110. The job macro registration confirmation picture M09 shows the setting values to be registered. The setting values to be registered here are setting values selected in the email picture M08 (setting values stored in the mail transmission parameters 116). If a No button B09a is pressed on the job macro registration confirmation picture M09, job macro registration is not performed, and the job macro control unit 122 causes the touch panel 109a to display again the email picture M08 as shown in FIG. 9A. If an Yes button B09b is pressed on the job macro registration confirmation picture M09 as shown in FIG. 9B, the job macro control unit 122 causes the touch panel 109a to display a job macro name setting picture M10 as shown in FIG. 9C, in accordance with the picture information 112 stored in the storage unit 110. An on-picture keyboard appears in the job macro name setting picture M10. By using the displayed on-picture keyboard, the user inputs a job macro name as job macro identification information for identifying a job macro including a group of setting values to be stored as the job macro setting file 111. When a Cancel button B10a is pressed in the job macro name setting picture M10, the registration of the job macro is cancelled, and the job macro control unit 122 causes the touch panel 109a to display again the email picture M08 as shown in FIG. 9A. When a Set button B10b is pressed in the job macro name setting picture M10 as shown in FIG. 9C, the job macro control unit 122 registers the job macro. For example, the job macro control unit 122 generates the job macro setting file 111 including setting values stored in the mail transmission parameters 116 in the storage unit 110 and the job macro name input on the job macro name setting picture M10 as shown in FIG. 9C. The job macro control unit 122 then directs the file management unit 123 to cause the storage unit 110 to store the generated job macro setting file 111. And then the job macro control unit 122 receives the file name of the stored job macro setting file 111 from the file management unit 123. The job macro control unit 122 causes the touch panel 109a to display an job macro registration notification picture Mil as shown in FIG. 9D, in accordance with the picture information 112 stored in the storage unit 110 and the file name received from the file management unit 123. The job macro registration notification picture Mil shows the file name of the registered job macro setting file 111 and the job macro name. When a Close button B11a is pressed on the job macro registration notification picture M11, the job macro control unit 122 causes the touch panel 109a to display again the email picture M08 as shown in FIG. 9A.

Figure 9:
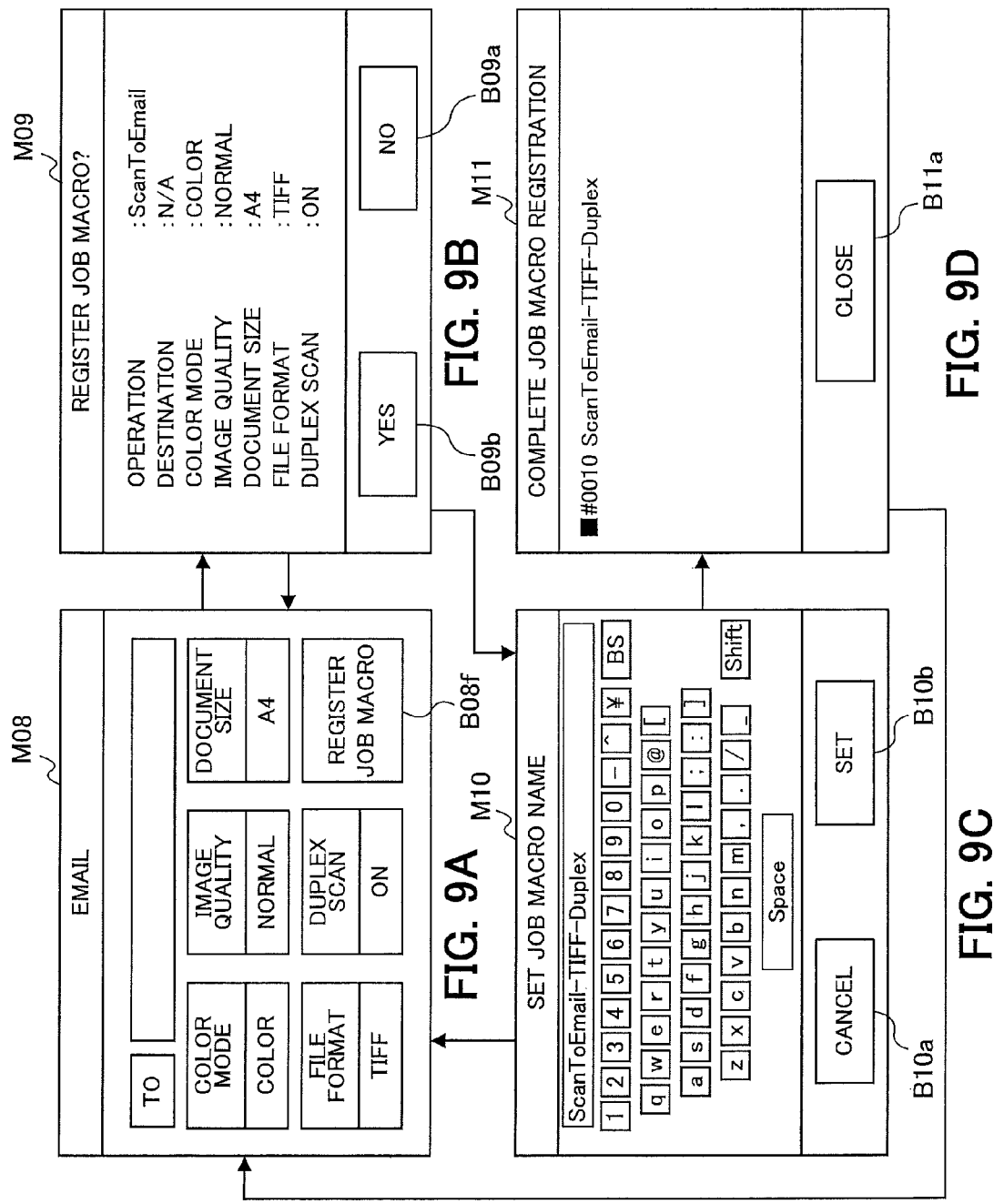
FIGS. 9A to 9D are schematic diagrams showing an example of pictures displayed when a group of setting values is stored as a job macro setting file in the image processing device in the first embodiment.
Figure 10:
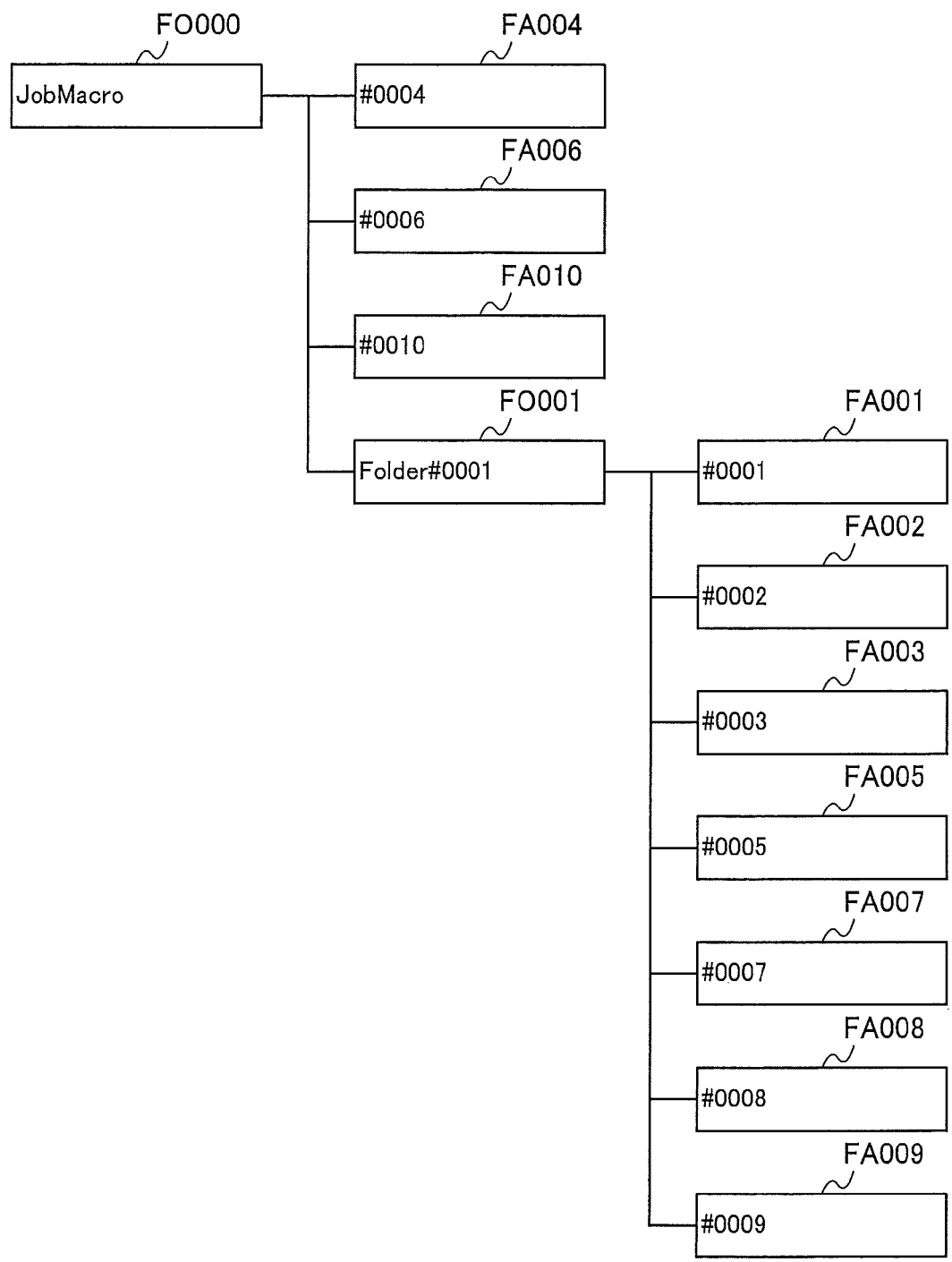
FIG. 10 is a schematic diagram showing a second example of a storage state of the job macro setting files in the first embodiment.

FIG. 10 is a schematic diagram showing a storage state of job macro setting files 111 after the job macro is registered as shown in FIG. 9, changed from the storage state of the job macro setting files 111 as shown in FIG. 2. In comparison with FIG. 2 a file FA010 named #0010 is added immediately under the folder FO000 named JobMacro. Since job macro setting file names up to #0009 have already been used, the file management unit 123 automatically assigns the file name #0010 to the job macro setting file 111 given from the job macro control unit 122 and stores the file immediately under the folder FO000 named JobMacro.

FIG. 11 is a schematic diagram showing the contents of the job macro setting file 111 saved as the file FA010 named #0010 in FIG. 10.

The job macro setting file 111 includes a name item 111a, an operation item 111b, a destination item 111c, a color mode item 111d, an image quality item 111e, a document size item 111f, a file format item 111g, and a duplex scan item 111h.

In the name item 111a, a name ScanToEmail-TIFF-Duplex input on the job macro name setting picture M10 as shown in FIG. 9C is saved. In the other fields 111b to 111h, the function names and setting values stored in the corresponding fields 116a to 116g of the mail transmission parameters 116 as shown in FIG. 8 are saved.

FIGS. 12A to 12D are schematic diagrams showing an example of pictures displayed on the operation unit 140 when a job macro is executed in the image processing device 100.

Figure 12:
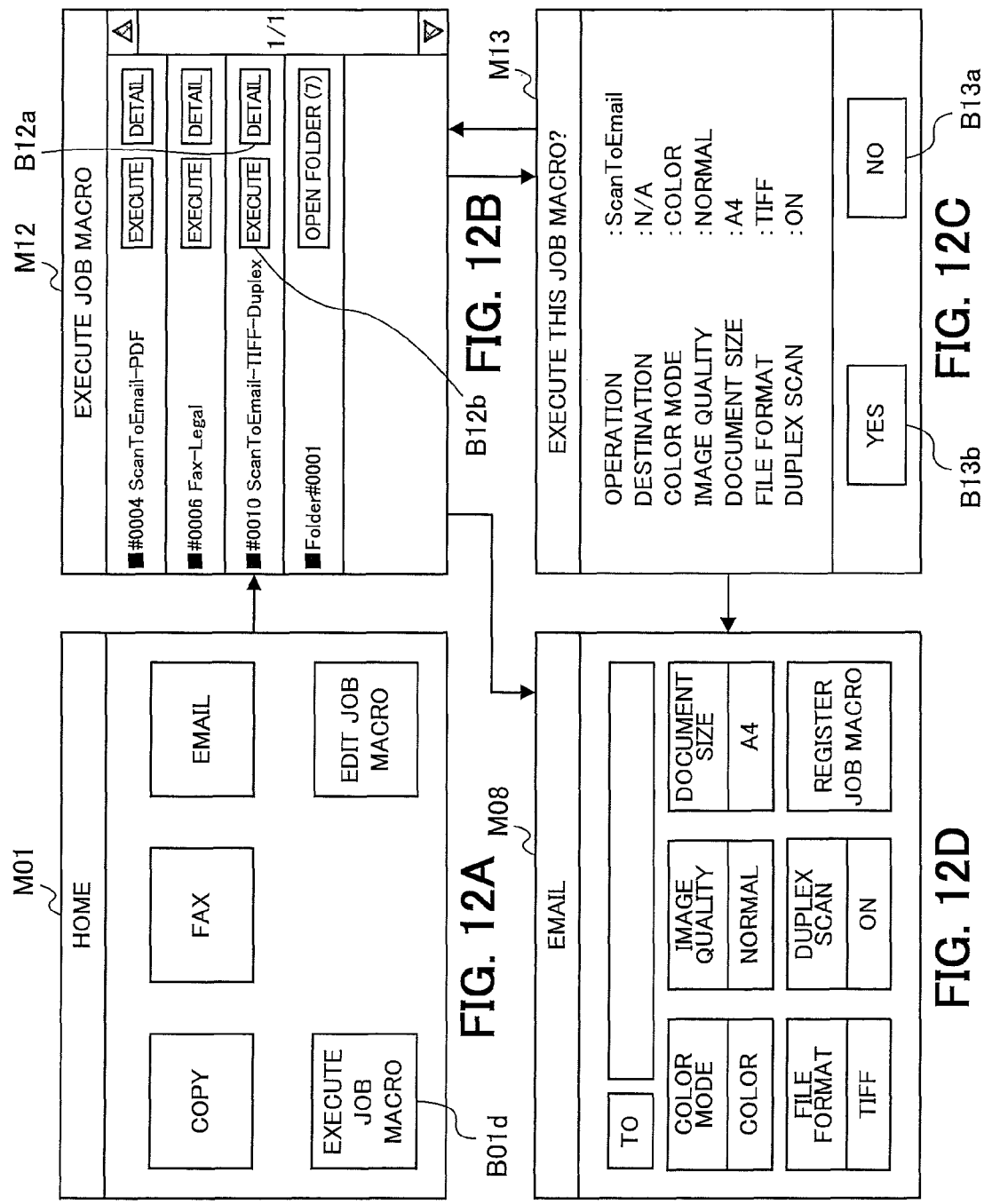
FIGS. 12A to 12D are schematic diagrams showing an example of pictures displayed when a job macro is executed in the image processing device in the first embodiment.

When an Execute Job Macro button B01d is pressed on the home picture M01 as shown in FIG. 12A, the job macro control unit 122 obtains a storage state of the job macro setting files 111 stored in the storage unit 110 by directing the file management unit 123. The job macro control unit 122 then causes the touch panel 109a to display a job macro execution picture M12 as shown in FIG. 12B, in accordance with the picture information 112 stored in the storage unit 110 and the storage state of the job macro setting files 111 obtained from the file management unit 123. The job macro execution picture M12 here shows an example when the storage state of the job macro setting files 111 is the state as shown in FIG. 10. The job macro execution picture M12 shows the following information as information of each job macro: file names of job macro setting files 111 stored immediately under the folder FO000 named JobMacro as the root folder and job macro names saved in the job macro setting files 111. For example, regarding the job macro setting file 111 named #0010, the job macro name ScanToEmail-TIFF-Duplex is saved in the name item 111a as shown in FIG. 11. Accordingly, regarding the job macro setting file 111 named #0010, the file name #0010 and the job macro name ScanToEmail-TIFF-Duplex are displayed.

When a Detail button B12a of #0010 is pressed on the job macro execution picture M12 as shown in FIG. 12B, the job macro control unit 122 obtains the job macro setting file 111 having the file name #0010 from the storage unit 110 by directing the file management unit 123. The job macro control unit 122 then causes the touch panel 109a to display a job macro setting confirmation picture M13 as shown in FIG. 12C, in accordance with the picture information 112 stored in the storage unit 110 and the job macro setting file 111 obtained from the file management unit 123. The job macro setting confirmation picture M13 shows the setting values saved in the job macro setting file 111 shown in FIG. 11. When a No button B13a is pressed on the job macro setting confirmation picture M13, the job macro control unit 122 causes the touch panel 109a to display again the job macro execution picture M12 as shown in FIG. 12B. When an Yes button B13b is pressed on the job macro setting confirmation picture M13, the job macro control unit 122 specifies a function in accordance with the operation item 111b saved in the job macro setting file 111 obtained from the file management unit 123 and updates the setting values stored in the parameters corresponding to the specified function. In the shown example, the job macro control unit 122 updates the setting values stored in the mail transmission parameters 116 to the setting values saved in the job macro setting file 111 obtained from the file management unit 123. The job macro control unit 122 then causes the touch panel 109a to display the email picture M08 after execution of the job macro corresponding to the file name #0010 shown in FIG. 12D, in accordance with the picture information 112 stored in the storage unit 110 and the updated mail transmission parameters 116. In the email picture M08, the setting values saved in the job macro setting file 111 shown in FIG. 11 are selected.

When an Execute button B12b of #0010 is pressed on the job macro execution picture M12 as shown in FIG. 12B, the job macro control unit 122 obtains the job macro setting file 111 having the file name #0010 from the storage unit 110 by directing the file management unit 123. The job macro control unit 122 updates the setting values stored in the mail transmission parameters 116 to the setting values saved in the job macro setting file 111 obtained from the file management unit 123. The job macro control unit 122 further causes the touch panel 109a to display the email picture M08 after execution of the job macro corresponding to the file named #0010 shown in FIG. 12D, in accordance with the picture information 112 stored in the storage unit 110 and the updated mail transmission parameters 116. The setting values saved in the job macro setting file 111 are thus restored when the job macro is executed.

FIGS. 13A to 13D and FIG. 14 are schematic diagrams showing an example of pictures displayed on the operation unit 140 when the job macro setting file 111 is moved in the image processing device 100.

Figure 13:
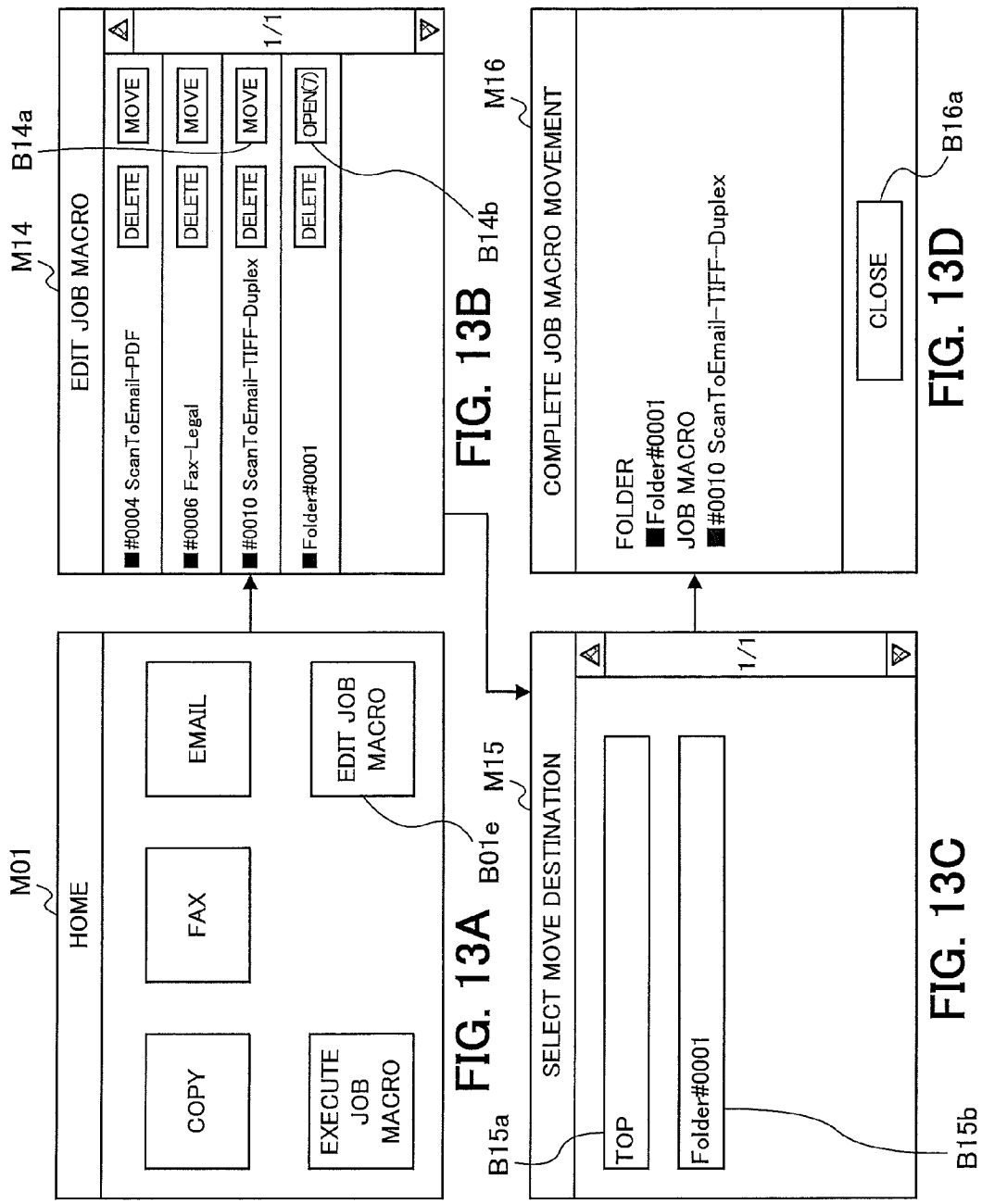
FIGS. 13A to 13D are schematic diagrams showing an example of first pictures displayed when the job macro setting file is moved in the image processing device in the first embodiment.
Figure 14:
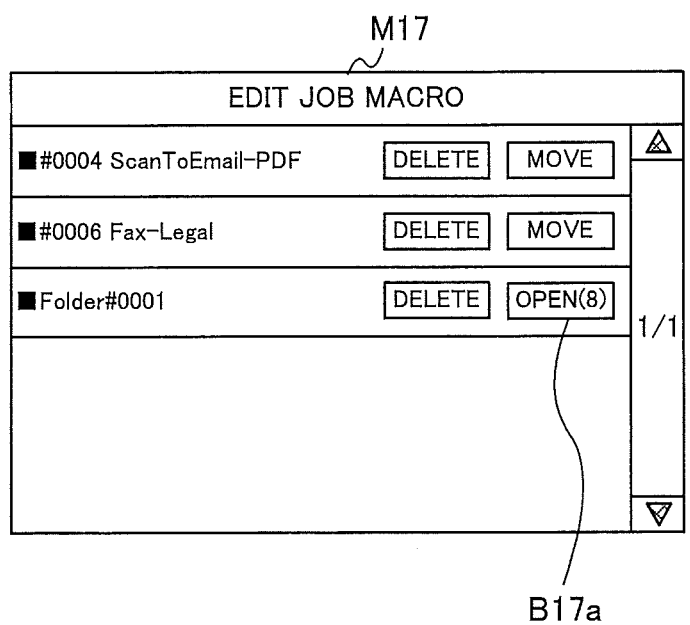
FIG. 14 is a schematic diagram showing an example of a second picture displayed when the job macro setting file is moved in the image processing device in the first embodiment.

When an Edit Job Macro button B01e is pressed on the home picture M01 as shown in FIG. 13A, the job macro control unit 122 obtains a storage state of the job macro setting files 111 stored in the storage unit 110 by directing the file management unit 123. The job macro control unit 122 then causes the touch panel 109a to display a job macro edit picture M14 as shown in FIG. 13B, in accordance with the picture information 112 stored in the storage unit 110 and the storage state of the job macro setting files 111 obtained from the file management unit 123. The shown job macro edit picture M14 is an example when the storage state of the job macro setting files 111 is the state as shown in FIG. 10. The job macro edit picture M14 shows the following information as information of each job macro: a file name of the job macro setting file 111 stored immediately under the folder FO000 named JobMacro as the root folder and a job macro name saved in the job macro setting file 111. When a Move button B14a of #0010 is pressed on the job macro edit picture M14, the job macro control unit 122 causes the touch panel 109a to display a move destination selection picture M15 as shown in FIG. 13C, in accordance with the picture information 112 stored in the storage unit 110 and the storage state of the job macro setting files 111 obtained from the file management unit 123. The move destination selection picture M15 has a button for specifying the root folder as the destination to which the job macro setting file 111 is moved and a button for specifying all folders placed under the root folder. For example, the picture shown in FIG. 13C has the Top button B15a provided to specify the folder FO000 named JobMacro, which is the root folder to store the job macro setting files 111, and the Folder#0001 button B15b provided to specify the folder named Folder#0001 placed immediately under the folder FO000 named JobMacro. When the Folder#0001 button B15b is pressed on the move destination selection picture M15, since it means that the folder named Folder#0001 is selected as the destination, the job macro control unit 122 causes the file management unit 123 to move the job macro setting file 111 having the file name #0001 to a position immediately under the folder named Folder#0001. The job macro control unit 122 then causes the touch panel 109a to display a job macro movement notification picture M16 as shown in FIG. 13D, in accordance with the picture information 112 stored in the storage unit 110. The job macro movement notification picture M16 shows the folder name of the folder to which the file has been moved, and the file name and job macro name of the moved job macro setting file 111. When a Close button B16a is pressed on the job macro. movement notification picture M16, the job macro control unit 122 obtains the storage state of the job macro setting files 111 stored in the storage unit 110 by directing the file management unit 123. The job macro control unit 122 then causes the touch panel 109a to display a job macro edit picture M17 as shown in FIG. 14, in accordance with the picture information 112 stored in the storage unit 110 and the storage state of the job macro setting files 111 obtained from the file management unit 123.

Figure 15:
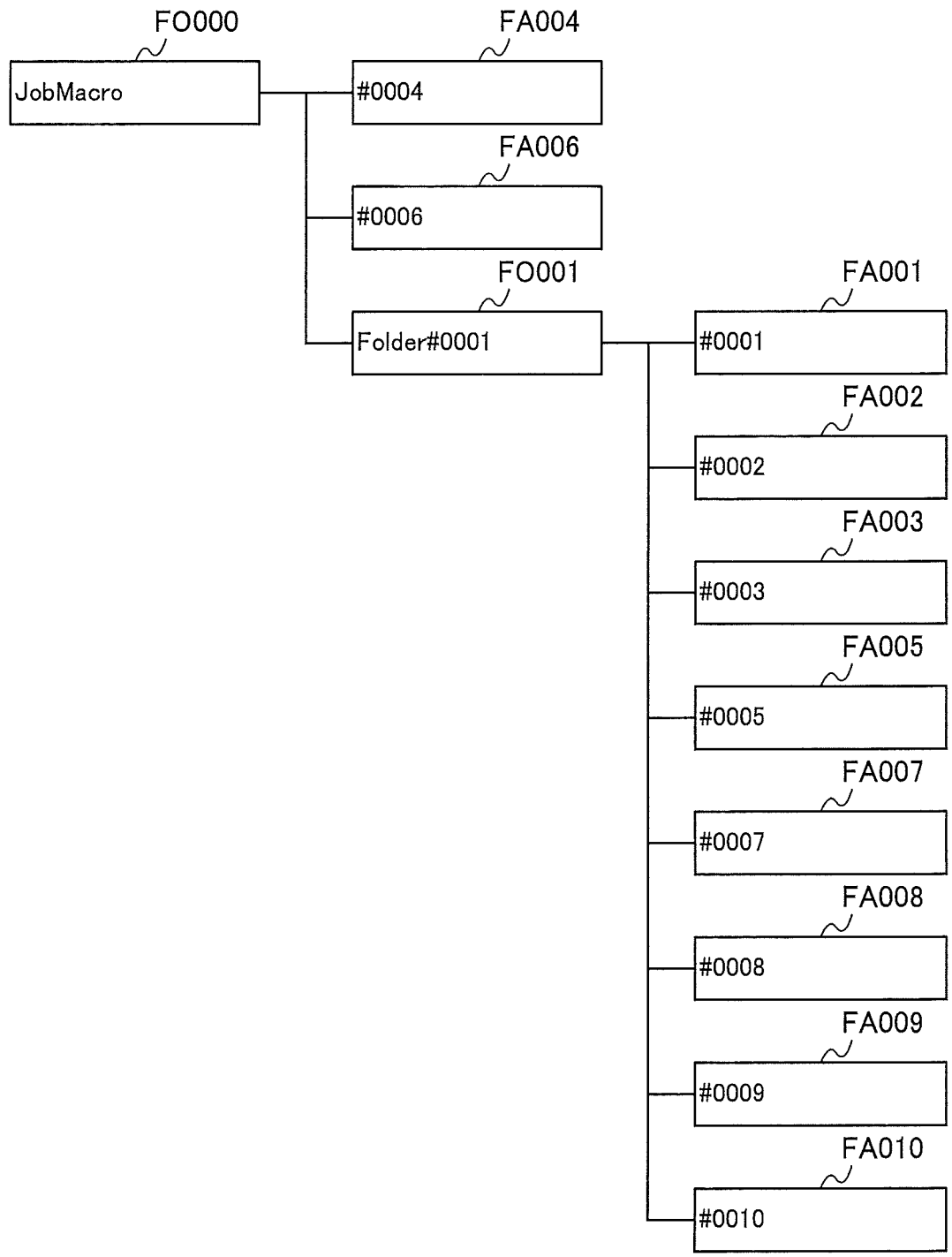
FIG. 15 is a schematic diagram showing a third example of a storage state of the job macro setting files in the first embodiment.

As a result of the movement of the job macro setting file 111 described with reference to FIGS. 13A to 13D and FIG. 14, the storage state of the job macro setting files is changed from the state as shown in FIG. 10 to the state as shown in FIG. 15. Although the file FA010 named #0010 was stored immediately under the folder FO000 named JobMacro as shown in FIG. 10, the file FA010 has been moved to a position below the folder FO000 named Folder#0001 as shown in FIG. 15. Therefore, the file named #0010 which is displayed on the job macro edit picture M14 in FIG. 13B is not displayed on the job macro edit picture M17 in FIG. 14.

An Open button B14b of Folder#0001 in the job macro edit picture M14 shown in FIG. 13B indicates the number of files included in the folder named Folder#0001. The folder named Folder#0001 contains seven files as shown in FIG. 10, and the number (7) is indicated in the Open button B14b. After the job macro setting file 111 is moved, the number of files included in the folder named Folder#0001 has changed to eight, as shown in FIG. 15, and the number (8) is indicated in the Open button B17a of Folder#0001 in the job macro edit picture M17 as shown in FIG. 14.

Figure 16:
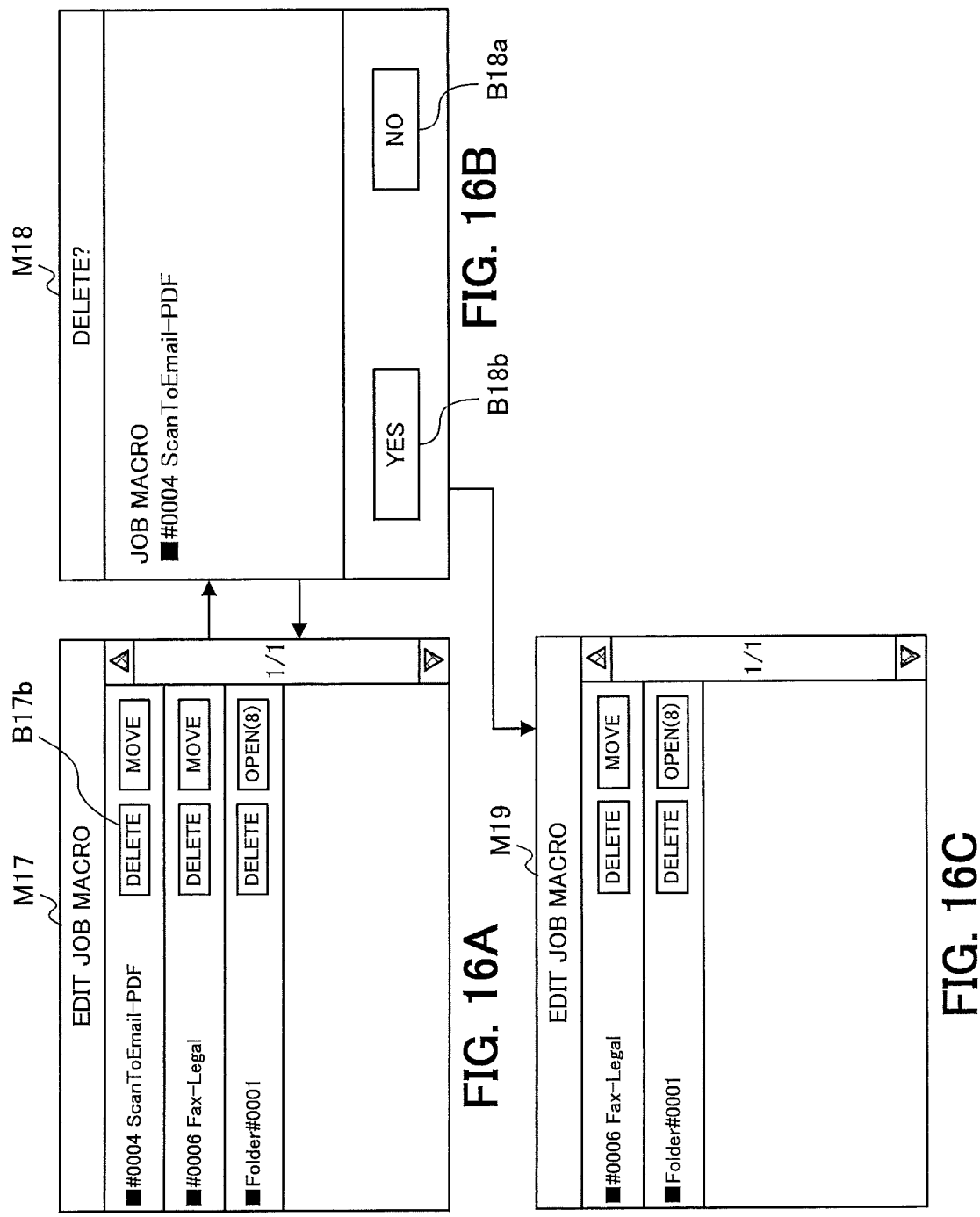
FIGS. 16A to 16C are schematic diagrams showing an example of pictures displayed when the job macro setting file is deleted in the image processing device in the first embodiment.

FIGS. 16A to 16C are schematic diagrams showing an example of pictures displayed on the operation unit 140 when the job macro setting file 111 is deleted in the image processing device 111.

When a Delete button B17b of #0004 is pressed on the job macro edit picture M17 as shown in FIG. 16A, the job macro control unit 122 causes the touch panel 109a to display a job macro delete confirmation picture M18 as shown in FIG. 16B, in accordance with the picture information 112 stored in the storage unit 110. The job macro delete confirmation picture M18 shows a file name of a file to be deleted out of the job macro setting files 111 and a job macro name of a job macro corresponding to the file to be deleted. When a No button B18a is pressed on the job macro delete confirmation picture M18, the job macro control unit 122 does not delete the file to be deleted out of the job macro setting files 111 and causes the touch panel 109a to display again the job macro edit picture M17 as shown in FIG. 16A. When an Yes button B18b is pressed on the job macro delete confirmation picture M18, the job macro control unit 122 causes the file management unit 123 to delete the job macro setting file 111 having a file name #0004. The job macro control unit 122 then obtains a storage state of the job macro setting files 111 in the storage unit 110 by directing the file management unit 123. The job macro control unit 122 next causes the touch panel 109a to display a job macro edit picture M19 as shown in FIG. 16C, in accordance with the picture information 112 stored in the storage unit 110 and the storage state of the job macro setting files 111 obtained from the file management unit 123.

Figure 17:
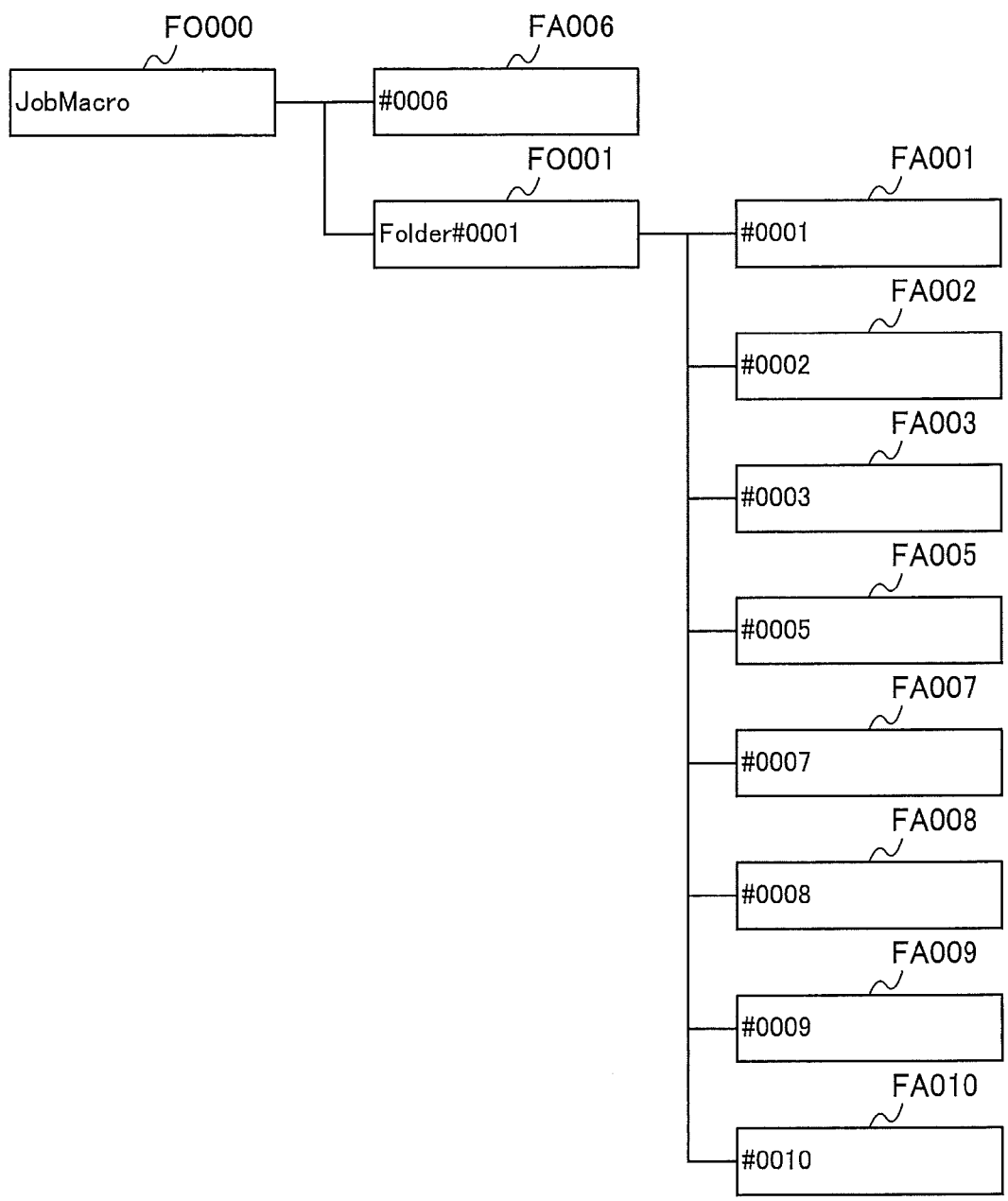
FIG. 17 is a schematic diagram showing a fourth example of a storage state of the job macro setting files in the first embodiment.

As a result of the deletion of the job macro setting file 111 described with reference to FIGS. 16A to 16c, the storage state of the job macro setting files 111 is changed from the state shown in FIG. 15 to the state shown in FIG. 17. The file FA004 named #0004 that was placed immediately under the folder FO000 named JobMacro in FIG. 15 is deleted in FIG. 17. Therefore, the file named #0004 which is shown in the job macro edit picture M17 in FIG. 16A is not displayed in the job macro edit picture M19 in FIG. 16C.

FIGS. 18A to 18D are schematic diagrams showing an example of pictures displayed on the operation unit 140 when a folder containing the job macro setting file 111 is deleted in the image processing device 100.

Figure 18A:
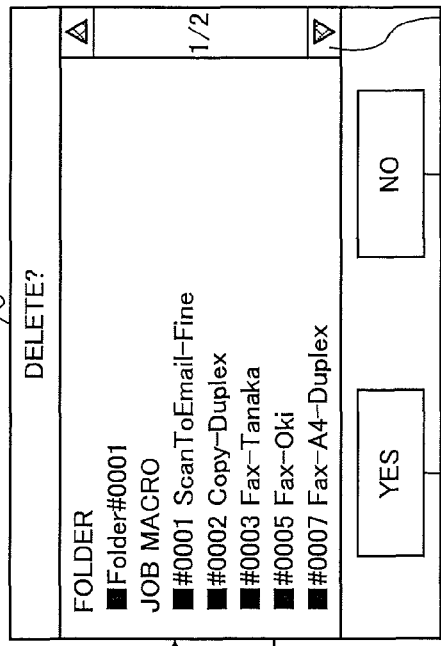
FIGS. 18A to 18D are schematic diagrams showing an example of pictures displayed when the job macro setting file is deleted in the image processing device in the first embodiment.
Figure 18B:
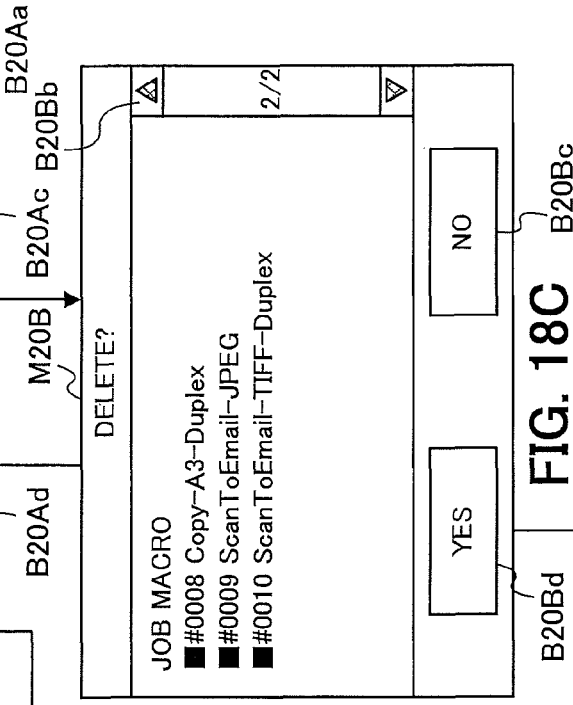
Figure 18C:
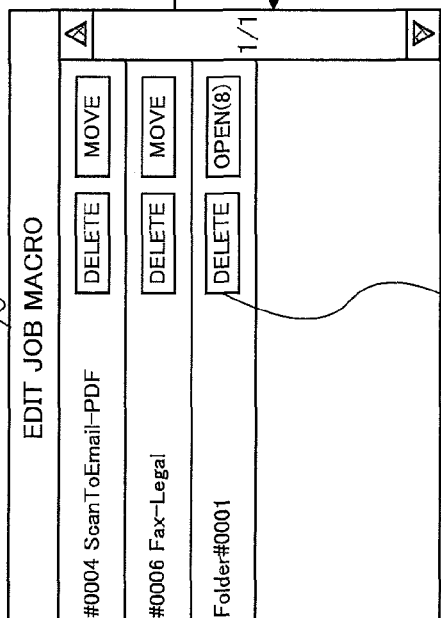

When a Delete button B17c of Folder#0001 is pressed in the job macro edit picture M17 as shown in FIG. 18A, the job macro control unit 122 obtains a storage state of the job macro setting files 111 by directing the file management unit 123. It is assumed here that the storage state of the job macro setting files 111 is as shown in FIG. 15. The job macro control unit 122 causes the touch panel 109a to display a folder delete confirmation picture M20A as shown in FIG. 18B, in accordance with the picture information 112 stored in the storage unit 110 and the storage state of the job macro setting files 111 obtained from the file management unit 123. The folder delete confirmation picture displays a list of all job macro setting files 111 stored in folder FO001 whose folder name is Folder#0001 which is the folder to be deleted. The folder delete confirmation picture here lists the file names and job macro names of the job macro setting files 111. If the file names and job macro names of all the job macro setting files 111 cannot be displayed on the single folder delete confirmation picture M20A, as shown in FIG. 18B, a file name and a job macro name which cannot be displayed on the single folder delete confirmation picture M20A are displayed on another folder delete confirmation picture M20B, as shown in FIG. 18C. When a down-pointing arrow button B20Aa is pressed on the folder delete confirmation picture M20A as shown in FIG. 18B, the job macro control unit 122 causes the touch panel 109a to display the folder delete confirmation picture M20B as shown in FIG. 18C, in accordance with the picture information 112 stored in the storage unit 110 and the storage state of the job macro setting files 111 obtained from the file management unit 123. When an up-pointing arrow button B20Bb is pressed on the folder delete confirmation picture M20B, the job macro control unit 122 causes the touch panel 109a to display the folder delete confirmation picture M20A again as shown in FIG. 18B.

Figure 18D:
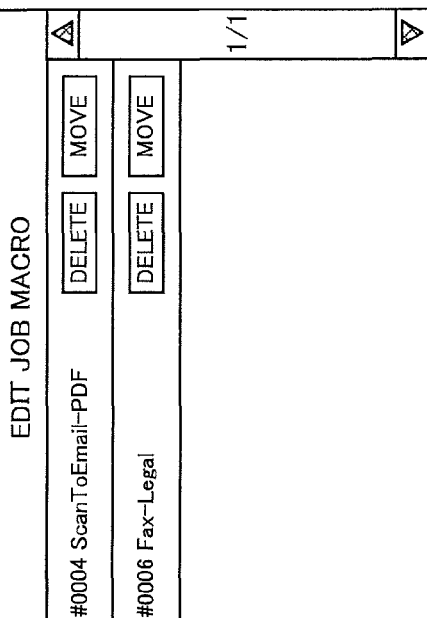

When a No button B20Ac in the folder delete confirmation picture M20A as shown in FIG. 18B or a No button B20Bc in the folder delete confirmation picture M20B as shown in FIG. 18C is pressed, the job macro control unit 122 does not delete the folder and causes the touch panel 109a to display again the job macro edit picture M17 as shown in FIG. 18A. When an Yes button B20Ad in the folder delete confirmation picture M20A as shown in FIG. 18B or an Yes button B20Bd in the folder delete confirmation picture M20B as shown in FIG. 18C is pressed, the job macro control unit 122 causes the file management unit 123 to delete all the job macro setting files 111 stored in the folder named Folder#0001 and to delete the folder named Folder#0001. Then, the job macro control unit 122 obtains the storage state of the job macro setting files 111 in the storage unit 110 by directing the file management unit 123. The job macro control unit 122 next causes the touch panel 109a to display a job macro edit picture M21 as shown in FIG. 18D, in accordance with the picture information 112 stored in the storage unit 110 and the storage state of the job macro setting files 111 obtained from the file management unit 123.

Figure 19:
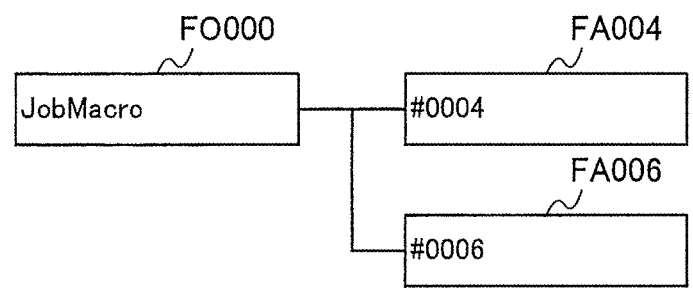
FIG. 19 is a schematic diagram showing a fifth example of a storage state of the job macro setting files in the first embodiment.

As a result of the deletion of the folder described with reference to FIGS. 18A to 18D, the storage state of the job macro setting files 111 is changed from the state shown in FIG. 15 to the state shown in FIG. 19, for example. The folder FO001 named Folder#0001 is placed immediately under the folder FO000 named JobMacro in FIG. 15, and the folder FO001 is not shown in FIG. 19. Accordingly, the folder named Folder#0001 which is displayed on the job macro edit picture M17 in FIG. 18A is not displayed in FIG. 18D.

Figure 20:
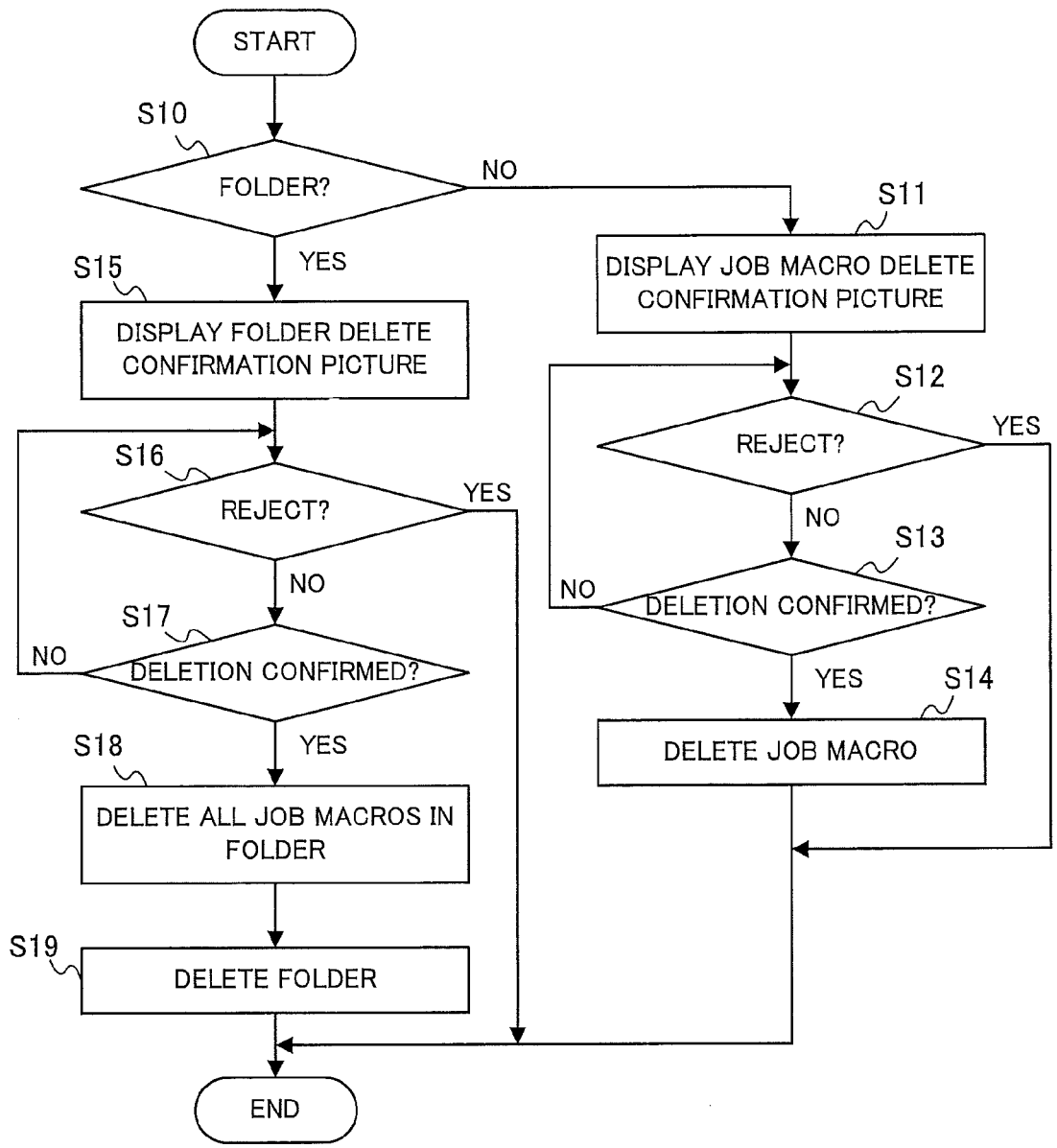
FIG. 20 is a flowchart illustrating processing to be performed when a delete instruction is input in the first embodiment.

FIG. 20 is a flowchart illustrating processing to be performed when the input unit 142 receives input of a delete instruction, or when the Delete button is pressed on the job macro edit picture M17.

The job macro control unit 122 checks whether or not a deletion target is a folder (step S10). If the deletion target is a file (No in step S10), the processing proceeds to step S11. If the deletion target is a folder (Yes in step S10), the processing proceeds to step S15.

In step S11, the job macro control unit 122 causes the display unit 141 to display the job macro delete confirmation picture for receiving input indicating whether or not the job macro setting file 111 which is the deletion target is deleted, in accordance with the picture information 112 stored in the storage unit 110.

The job macro control unit 122 then checks whether or not the input unit 142 has received, through the job macro delete confirmation picture, input of a confirmation (or input of a rejection) of not deleting the job macro setting file 111 which is the deletion target (step S12). If the confirmation has been received (Yes in step S12), the processing ends. If the confirmation has not been received (No in step S12), the processing proceeds to step S13.

In step S13, the job macro control unit 122 checks whether or not the input unit 142 has received, through the job macro delete confirmation picture, input of a confirmation of deleting the job macro setting file 111 which is the deletion target. If the confirmation has been received (Yes in step 13), the processing proceeds to step S14. If the confirmation has not been received (No in step S13), the processing returns to step S12.

In step S14, the job macro control unit 122 causes the file management unit 123 to delete the job macro setting file 111 which is the deletion target.

In step S15, since the deletion target is a folder, the job macro control unit 122 obtains a storage state of the job macro setting files 111 by directing the file management unit 123. The job macro control unit 122 then causes the display unit 141 to display the folder delete confirmation picture for receiving input indicating whether or not the folder as the deletion target is deleted, in accordance with the picture information 112 stored in the storage unit 110 and the storage state obtained from the file management unit 123. The folder delete confirmation picture shows a list of files stored in the folder as the deletion target.

The job macro control unit 122 then checks whether or not the input unit 142 has received, through the folder delete confirmation picture, input of a confirmation (or input of a rejection) of not deleting the folder as the deletion target (step S16). If the confirmation has been received (Yes in step S16), the processing ends. If the confirmation has not been received (No in step S16), the processing proceeds to step S17.

In step S17, the job macro control unit 122 checks whether or not the input unit 142 has received, through the folder delete confirmation picture, input of a confirmation of deleting the folder as the deletion target. If the confirmation has been received (Yes in step S17), the processing proceeds to step S18. If the confirmation has not been received (No in step S17), the processing returns to step S16.

In step S18, the job macro control unit 122 causes the file management unit 123 to delete all the job macro setting files 111 included in the folder as the deletion target.

The job macro control unit 122 then causes the file management unit 123 to delete the folder as the deletion target (step S19).

According to the first embodiment, when a delete operation concerning a folder is received, it is possible to display information which enables to identify all files in the folder and to inquire of the user whether or not a deletion should be performed. Even if the user does not check the contents of the folder before inputting the delete operation, a file that should not be deleted can be left undeleted even when the folder containing the file is deleted.

Second Embodiment

As shown in FIG. 1, an image processing device 200, which is an example of an information processing device according to a second embodiment, includes a storage unit 210, a control unit 220, a function unit 130, and an operation unit 240. The image processing device 200 according to the second embodiment differs from the image processing device 100 according to the first embodiment in the storage unit 210, control unit 220, and operation unit 240.

The storage unit 210 stores information required to perform processing in the image processing device 200. The storage unit 210 stores job macro setting files 111, picture information 212, setting value information 113, copy parameters 114, facsimile transmission parameters 115, and mail transmission parameters 116, for example. The storage unit 210 in the second embodiment differs from the storage unit 110 in the first embodiment in the picture information 212.

The picture information 212 is information required to generate picture data of a picture to be displayed on the operation unit 240. In the second embodiment, a command and partial image data to generate the picture data of the picture to be displayed on the operation unit 240 when a folder is deleted are different from those in the first embodiment. The picture to be displayed on the operation unit 240 when a folder is deleted will be described later.

The control unit 220 controls processing performed in the image processing device 200.

The control unit 220 includes an execution unit 221, a copy control unit 124, a facsimile transmission control unit 125, and a mail transmission control unit 126. The control unit 220 in the second embodiment differs from the control unit 120 in the first embodiment in the execution unit 221.

The execution unit 221 selects setting values for processing to be performed by the function unit 130. The execution unit 221 performs management (generation, correction, deletion and the like) of the job macro setting file 111 and selects setting values for the processing to be performed by the function unit 130 in accordance with the job macro setting file 111.

The execution unit 221 includes a job macro control unit 222 and a file management unit 123. The execution unit 221 in the second embodiment differs from the execution unit 121 in the first embodiment in the job macro control unit 222.

The job macro control unit 222 receives, through the operation unit 240, a selection of a file that may be deleted among files included in the folder, when a folder is deleted, as well as performs the same processing as in the first embodiment. The job macro control unit 222 causes the file management unit 123 to delete the selected file.

The operation unit 240 functions in the same manner as in the first embodiment and also functions as a selection receiving unit which receives a selection as to whether to perform processing on each file included in a list of files based on an operation by the user. The operation unit 240 includes a display unit 241 which displays a picture for the user and an input unit 242 which receives input of an operation by the user.

FIGS. 21A to 21D are schematic diagrams showing an example of pictures displayed on the operation unit 240 when a folder containing the job macro setting file 111 is deleted in the image processing device 200.

Figure 21:
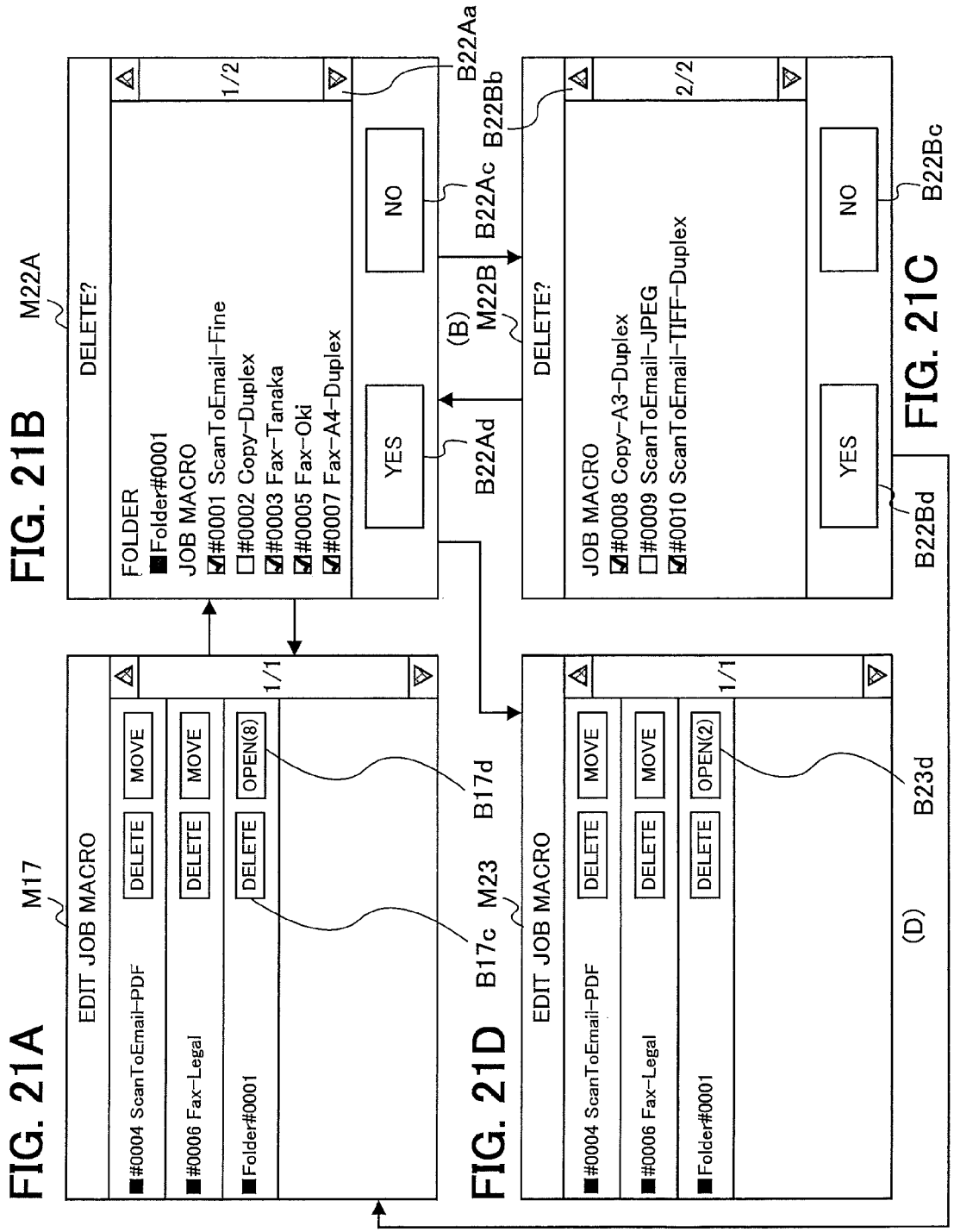
FIGS. 21A to 21D are schematic diagrams showing an example of pictures displayed when a folder containing job macro setting files is deleted in the image processing device according to the second embodiment.

When a Delete button B17c of Folder#0001 is pressed on a job macro edit picture M17 as shown in FIG. 21A, the job macro control unit 222 obtains a storage state of the job macro setting files 111 by directing the file management unit 123. It is assumed here that the storage state of the job macro setting files 111 is the state as shown in FIG. 15. The job macro control unit 222 then causes the touch panel 109a to display a deletion target selection picture M22A as shown in FIG. 21B, in accordance with the picture information 212 stored in the storage unit 210 and the storage state of the job macro setting files 111 obtained from the file management unit 123. The deletion target selection picture M22A shows a list of all the job macro setting files 111 stored in a folder FO001 whose folder name is Folder#0001 and which is a folder to be deleted. The deletion target selection picture M22A here shows a list of file names and job macro names of the job macro setting files 111. If the file names and job macro names of all the job macro setting files 111 cannot be displayed on the single deletion target selection picture M22A, as shown in FIG. 21B, a file name and a job macro name of the job macro setting file 111 that cannot be displayed are displayed on another deletion target selection picture M22B, as shown in FIG. 21C. When a down-pointing arrow button B22A*a* is pressed on the deletion target selection picture M22A as shown in FIG. 21B, the job macro control unit 222 causes the touch panel 109*a* to display the deletion target selection picture M22B as shown in FIG. 21C, in accordance with the picture information 212 stored in the storage unit 210 and the storage state of the job macro setting files 111 obtained from the file management unit 123. When an up-pointing arrow button B22B*b* is pressed on the deletion target selection picture M22B, the job macro control unit 222 causes the touch panel 109*a* to display again the deletion target selection picture M22A as shown in FIG. 21B.

In the deletion target selection pictures M22A and M22B, checkboxes are added for each of the displayed file names and the displayed job macro names of the job macro setting files 111. All the checkboxes are marked with check marks in an initial state, and when the user removes the check mark by touching it on the touch panel 109*a* or the like, the corresponding job macro setting file 111 is out of the deletion targets.

When a No button B22A*c* on the deletion target selection picture M22A as shown in FIG. 21B or a No button B22B*c* on the deletion target selection picture M22B as shown in FIG. 21C is pressed, the job macro control unit 222 does not delete the folder and the files and causes the touch panel 109*a* to display again the job macro edit picture M17 as shown in FIG. 21A. When an Yes button B22A*d* on the deletion target selection picture M22A as shown in FIG. 21B or an Yes button B22B*d* on the deletion target selection picture M22B as shown in FIG. 21C is pressed, the job macro control unit 222 causes the file management unit 123 to delete the job macro setting files 111 as the deletion targets. This operation deletes all the files checked in the checkboxes. Since all the files contained in the folder named Folder#0001 are the deletion targets in the initial state, all those files are deleted unless check marks are removed from their checkboxes. If all the files contained in the folder are deleted as a result of deletion of the job macro setting files 111, the job macro control unit 222 causes the file management unit 123 to delete the folder as the deletion target. Since check marks are removed from the checkboxes of the files named #0002 and #0009 on the deletion target selection pictures M22A and M22B as shown in FIGS. 21B and 21C, the corresponding job macro setting files 111 are not deleted. Consequently, the folder named Folder#0001 is not deleted either. The job macro control unit 222 next obtains the storage state of the job macro setting files 111 in the storage unit 210 by directing the file management unit 123. The job macro control unit 222 then causes the touch panel 109*a* to display a job macro edit picture M23 as shown in FIG. 21D, in accordance with the picture information 212 stored in the storage unit 210 and the storage state of the job macro setting files 111 obtained from the file management unit 123.

Figure 22:
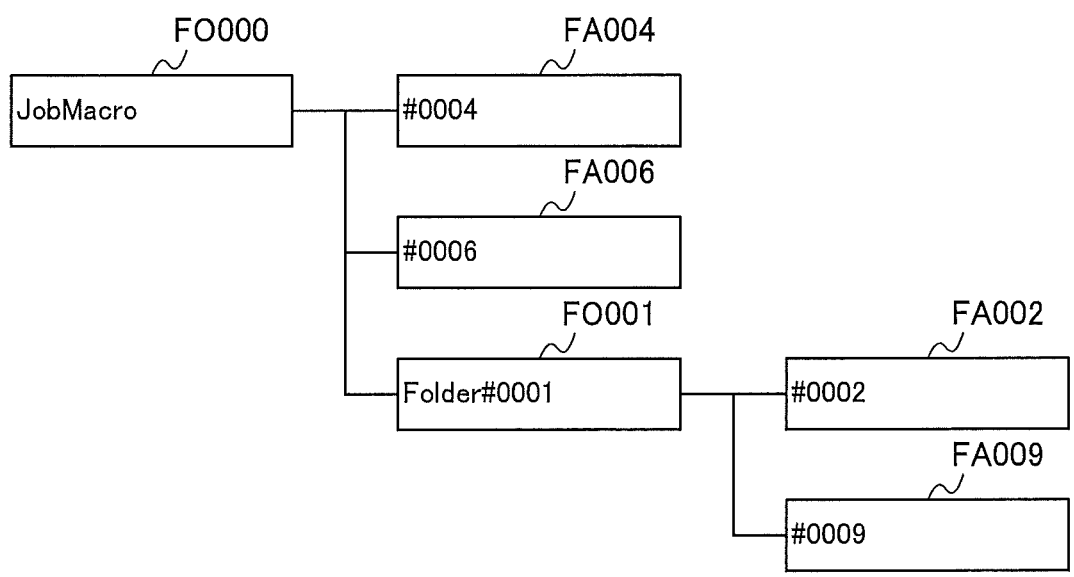
FIG. 22 is a schematic diagram showing a storage state of the job macro setting files in the second embodiment.

As a result of the folder deletion, which has been described with reference to FIG. 21A to 21D, the storage state of the job macro setting files 111 is changed from the state as shown in FIG. 15 to the state as shown in FIG. 22, for example. The folder FO001 named Folder#0001 has eight files in FIG. 15 and has just two files named #0002 and #0009 in FIG. 22. Accordingly, the number of files indicated in an Open button B17*d* of the folder named Folder#0001 is 8 in the job macro edit picture M17 shown in FIG. 21A, and the number of files indicated in an Open button B23*d* of the folder named Folder#0001 is 2 in FIG. 21D.

Figure 23:
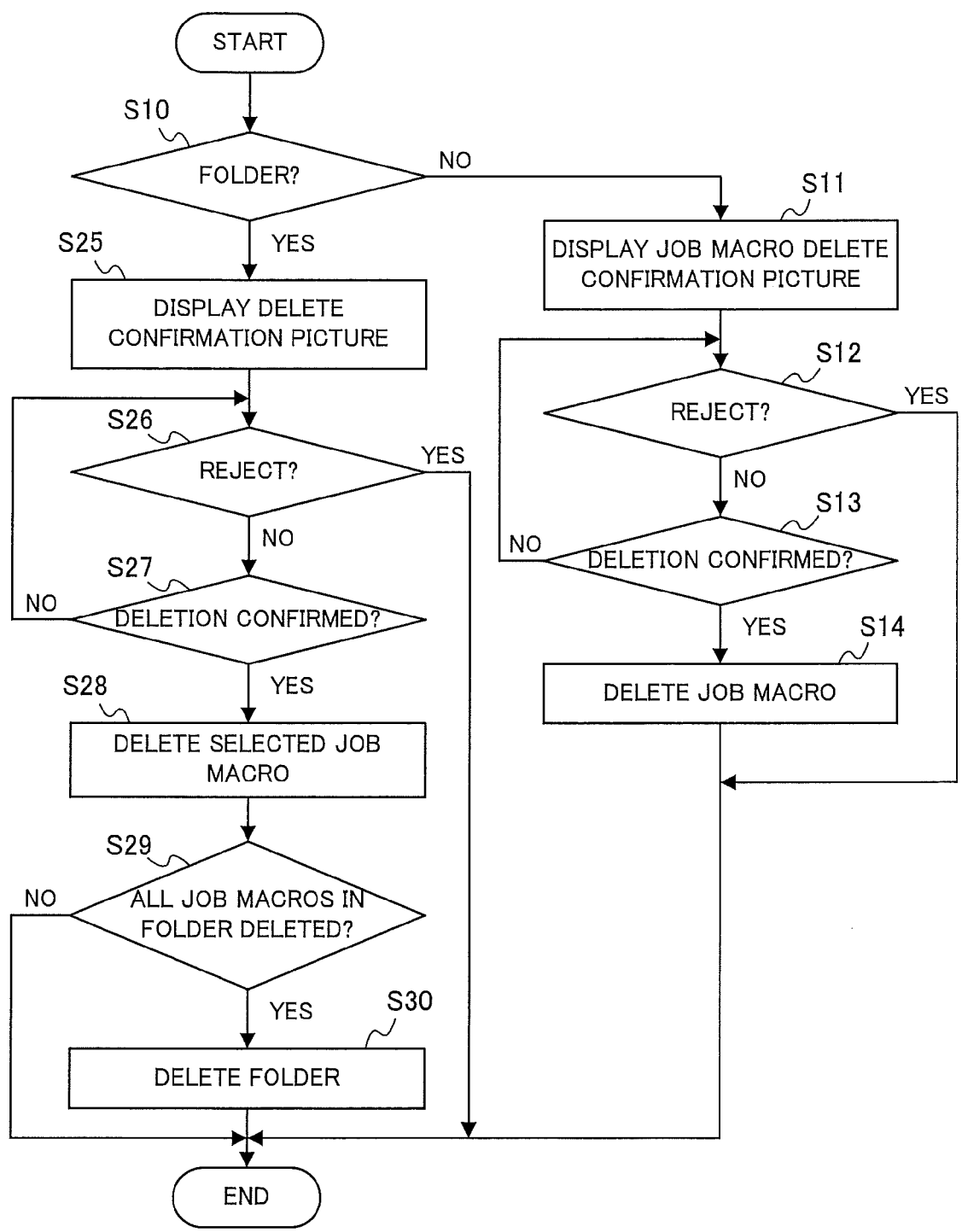
FIG. 23 is a flowchart illustrating processing to be performed when a delete instruction is input in the second embodiment.

FIG. 23 is a flowchart illustrating processing to be performed in the second embodiment when the input unit 242 receives a delete instruction, or when the Delete button is pressed on the job macro edit picture M17. In the flowchart shown in FIG. 23, steps identical to those in the processing illustrated in FIG. 20 are denoted by the same reference characters.

Steps S10 to S14 in FIG. 23 are the same as steps S10 to S14 in FIG. 20.

If the deletion target is a folder (Yes in step S10), the processing proceeds from step S10 to step S25.

Since the deletion target is a folder, the job macro control unit 222 obtains the storage state of the job macro setting files 111 by directing the file management unit 123 in step S25. The job macro control unit 222 then causes the display unit 241 to display the deletion target selection picture, on which a file to be deleted can be selected among the files contained in the target folder, in accordance with the picture information 212 stored in the storage unit 210 and the storage state obtained from the file management unit 123. The user can input a selection of a file to be deleted or a file not to be deleted through the deletion target selection picture to the input unit 242.

The job macro control unit 222 next checks whether or not the input unit 242 has received, through the deletion target selection picture, input of a confirmation (or input of a rejection) of not deleting the folder as the deletion target (step S26). If the confirmation has been received (Yes in step S26), the processing ends. If the confirmation has not been received (No in step S26), the processing proceeds to step S27.

In step S27, the job macro control unit 222 checks whether the input unit 242 has received through the deletion target selection picture, input of a confirmation of deleting the folder as the deletion target. If the confirmation has been received (Yes in step S27), the processing proceeds to step S28. If the confirmation has not been received (No in step S27), the processing returns to step S26.

In step S28, the job macro control unit 222 causes the file management unit 123 to delete the job macro setting file 111 which is selected as the deletion target.

The job macro control unit 222 then checks whether or not all files have been deleted from the folder as the deletion target (step S29). The job macro control unit 222 can execute the check by directing the file management unit 123 to obtain the storage state of the job macro setting files 111 in the storage unit 210, for example.

If all the files have been deleted (Yes in step S29), the processing proceeds to step S30. If not all files have been deleted (No in step S29), the processing ends.

In step S30, the job macro control unit 222 causes the file management unit 123 to delete the folder as the deletion target.

According to the second embodiment, when an instruction to delete a folder is received, it is possible to display all files contained in the folder, and to allow the use to determine whether or not the deletion should be performed on each file. Therefore, even if the user does not check the contents of the folder in advance, a file that should not be deleted can be left undeleted even when the delete operation is performed on the folder.

In the description of the first embodiment, the folder to be deleted contains just files, but the folder may not be limited to that type. For example, the folder as the deletion target may contain folders hierarchically. In that case, all the files and the hierarchical structure are shown on the folder delete confirmation picture, and the file which the user does not intend to delete is prevent from being deleted.

Figure 24:
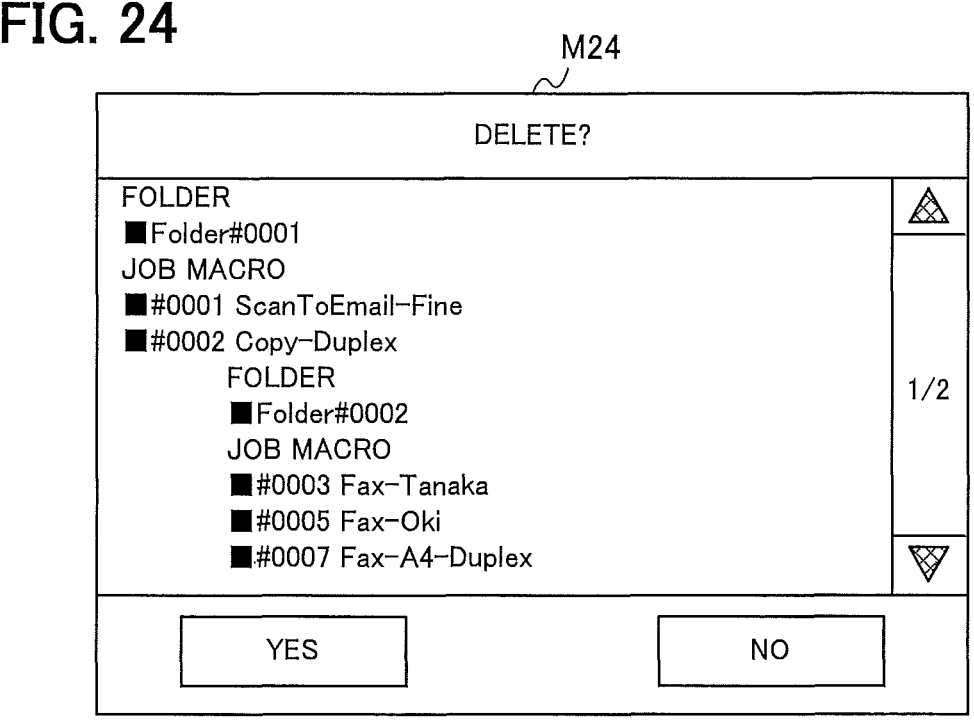
FIG. 24 is a schematic diagram showing a first modification example of a folder delete confirmation picture in the first embodiment.

For example, all the files and the hierarchical structure can be displayed by using indentation, as shown in a folder delete confirmation picture M24 in FIG. 24.

Figure 25:
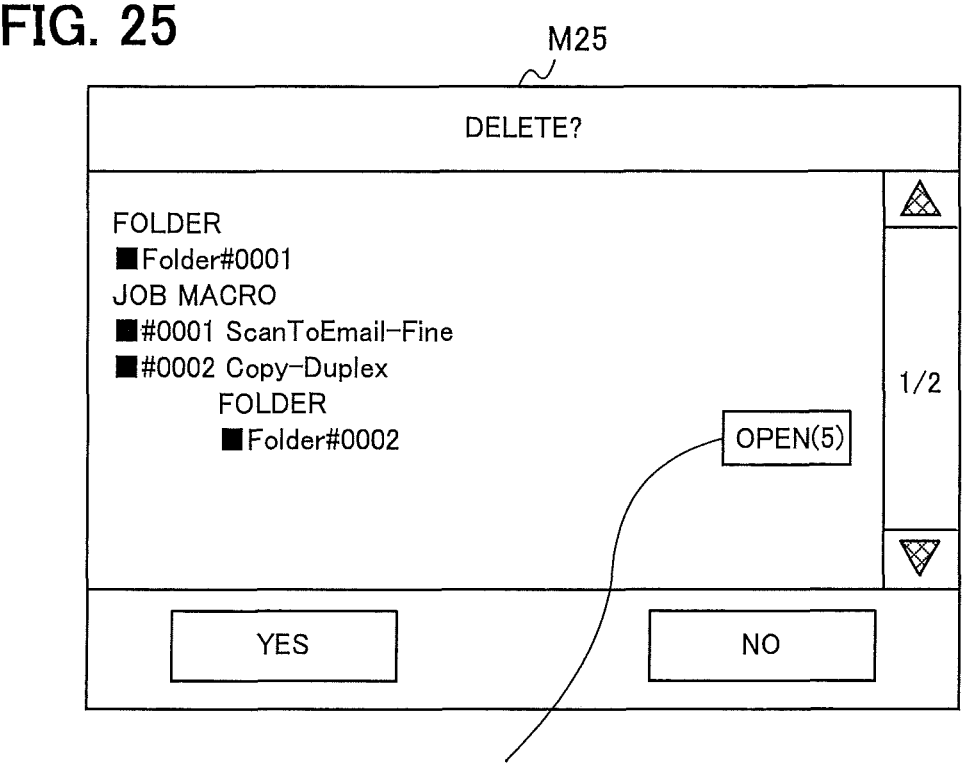
FIG. 25 is a schematic diagram showing a second modification example of the folder delete confirmation picture in the first embodiment.

As shown in a folder delete confirmation picture M25 in FIG. 25, an Open button B25a may be provided for a folder placed under the folder as the deletion target, and file names and job macro names of files contained in the folder may be displayed when the Open button B25a is pressed.

The deletion target selection picture in the second embodiment can also be configured as shown in FIGS. 24 and 25, so that all the files and the hierarchical structure are displayed to select a file or a folder to be deleted.

In the first and second embodiments described above, the folder delete confirmation picture and the deletion target selection picture show the file names and job macro names of the job macro setting files 111, but the present invention is not limited to this example. For example, the pictures may show either the file names or the job macro names.

In the first and second embodiments described above, it is configured that the user inputs a job macro name. The present invention, however, is not limited to that configuration. For example, the job macro control unit 122 or 222 may determine a job macro name automatically on the basis of information saved in the job macro setting file 111. Specifically, the job macro control unit 122 or 222 may specify a job macro name by connecting a function name of the job macro setting file 111 and information which is capable of indicating a setting value changed from an initial value in a predetermined format.

In the first and send embodiments described above, the job macro setting files 111 have consecutive numbers as their file names, but the present invention is not limited to that configuration. For example, a job macro name can be used as a file name of the job macro setting file 111. In that case, the job macro control unit 122 or 222 may automatically determine the job macro name, and the file name of the job macro setting file 111 would be displayed on the folder delete confirmation picture and the deletion target selection picture.

In the first and second embodiments described above, when a folder is deleted, information indicating the files included in the folder is displayed, but the present invention is not limited to that configuration. The information indicating the files included in the folder may be displayed when predetermined processing such as moving or renaming is performed on the folder. In that case, the information to be displayed may be changed depending on the processing to be performed on the folder. For example, when the folder is deleted, the file name and job macro name of the job macro setting file 111 may be displayed, as described earlier; when the folder is going to be moved, either the file name or the job macro name of the job macro setting file 111 may be displayed.

In the first and second embodiments described above, the job macro control unit 122 or 222 respectively has the display unit 141 or 241 display pictures, but the present invention is not limited to that configuration. For example, the execution unit 121 or 221 may include further a display control unit, which is not shown in the figure, and the display control unit may cause the display unit 141 or 241 to display necessary pictures by using picture information and the like.

REFERENCE CHARACTERS 100, 200, image processing device, 101 ROM, 102 RAM, 103 HDD, 104 CPU, 105 NIC, 106 printing device, 107 scanning device, 108 facsimile device, 109 operation panel, 110, 210 storage unit, 111 job macro setting file, 112 picture information, 113 setting value information, 114 copy parameter, 115 facsimile transmission parameter, 116 mail transmission parameter, 120, 220 control unit, 121, 221 execution unit, 122, 222 job macro control unit, 123 file management unit, 124 copy control unit, 125 facsimile transmission control unit, 126 mail transmission control unit, 130 function unit, 131 communication unit, 132 image forming unit, 133 image reading unit, 134 facsimile communication unit, 140, 240 operation unit, 141, 241 display unit, 142, 242 input unit.

What is claimed is:

1. An information processing device for executing first processing on a folder that includes files, comprising:
   a central processing unit (CPU),
   an operation device including a display, and
   a storage medium having program instructions stored thereon, execution of which by the CPU causes the information processing device to provide functions of:
   an instruction unit that receives an execution instruction of the first processing to be performed on the folder via the operation device, the operation device causing the display to display a list of files stored in the folder and information to inquire confirmation for executing the first processing when the instruction unit receives the execution instruction;
   a receiving unit that receives the confirmation via the operation device, after the list of files has been displayed on the display; and
   an execution unit that executes the first processing on the folder and each file in the folder, upon the receiving unit receiving the confirmation;
   wherein the operation device displays the list of files and information to inquire the confirmation on a single picture of the display.

2. The information processing device of claim 1, wherein the first processing is deletion processing or movement processing.

3. The information processing device of claim 1, wherein the file includes execution contents of second processing to be executed by the information processing device.

4. The information processing device of claim 3, wherein the second processing is image forming processing, image reading processing, or communication processing.

5. The information processing device of claim 4, further comprising:
   an image forming unit which executes the image forming processing; and
   a file designation unit which receives designation of a file via the operation device;
   wherein the image forming unit executes the image forming processing according to the execution contents of the file the designation of which the file designation unit has received.

6. The information processing device of claim 3, wherein the list of files displayed on the display includes information indicating at least a part of the execution contents included in the file.

7. The information processing device of claim 1, wherein the list of files displayed on the display includes file names of the files.

8. A method for using an information processing apparatus to execute first processing on a folder that includes files, the information processing apparatus having a central processing unit (CPU) and an operation device including a display, the method comprising:

receiving, via the operation device, an execution instruction of the first processing to be performed on the folder;

displaying, on the display, a list of files stored in the folder and information to inquire confirmation for executing the first processing when the execution instruction is received;

receiving, via the operation device, the confirmation after the list of files has been displayed on the display; and executing the first processing, using the CPU, on the folder and each file in the folder, upon receiving the confirmation;

wherein information to inquire the confirmation is displayed with the list of files on a single picture of the display.

9. A non-transitory computer-readable medium containing program instructions for an information processing apparatus to execute first processing on a folder that includes files, the information processing apparatus having a central processing unit (CPU) and an operation device including a display, execution of the program instructions by the CPU causing the information processing apparatus to perform the steps of:

receiving, via the operation device, an execution instruction of the first processing to be performed on the folder;

displaying a list of files stored in the folder and information to inquire confirmation for executing the first processing when the execution instruction is received;

receiving, via the operation device, the confirmation after the list of files has been displayed on the display; and executing the first processing, using the CPU, on the folder and each file in the folder, upon receiving the confirmation;

wherein information to inquire the confirmation is displayed with the list of files on a single picture of the display.

\* \* \* \* \*